United States Patent
Rojas-Cessa et al.

(10) Patent No.: US 8,274,988 B2
(45) Date of Patent: Sep. 25, 2012

(54) FORWARDING DATA THROUGH A THREE-STAGE CLOS-NETWORK PACKET SWITCH WITH MEMORY AT EACH STAGE

(75) Inventors: Roberto Rojas-Cessa, Brooklyn, NY (US); Ziqian Dong, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 247 days.

(21) Appl. No.: 12/511,814

(22) Filed: Jul. 29, 2009

(65) Prior Publication Data

US 2011/0026532 A1 Feb. 3, 2011

(51) Int. Cl.
*H04L 12/56* (2006.01)
*H04L 12/50* (2006.01)
*H04L 12/28* (2006.01)
*H04Q 11/00* (2006.01)

(52) U.S. Cl. .................... 370/413; 370/388; 370/395.41; 370/419

(58) Field of Classification Search .................. 370/413, 370/388, 415, 417, 353, 395.1, 419, 386, 370/389, 395.41, 395.42
See application file for complete search history.

(56) References Cited

U.S. PATENT DOCUMENTS

| | | | | |
|---|---|---|---|---|
| 6,940,851 B2 * | 9/2005 | Oki et al. | ....................... | 370/388 |
| 6,961,342 B1 * | 11/2005 | Uzun et al. | ..................... | 370/414 |
| 7,006,514 B2 * | 2/2006 | Oki et al. | ....................... | 370/415 |
| 7,046,661 B2 * | 5/2006 | Oki et al. | ....................... | 370/388 |
| 7,103,056 B2 * | 9/2006 | Chao et al. | ..................... | 370/417 |
| 7,535,893 B1 * | 5/2009 | Beladakere et al. | .......... | 370/353 |
| 7,843,908 B2 * | 11/2010 | Rojas-Cessa et al. | ........ | 370/386 |
| 2002/0061028 A1 | 5/2002 | Chao et al. | | |
| 2002/0147851 A1 * | 10/2002 | Morimura et al. | ............. | 709/249 |
| 2003/0021266 A1 * | 1/2003 | Oki et al. | ....................... | 370/388 |
| 2004/0081184 A1 * | 4/2004 | Magill et al. | ................... | 370/413 |
| 2004/0085967 A1 * | 5/2004 | Boduch et al. | ........... | 370/395.42 |
| 2005/0025141 A1 * | 2/2005 | Chao et al. | ..................... | 370/386 |
| 2007/0053356 A1 * | 3/2007 | Konda | .......................... | 370/390 |
| 2008/0212472 A1 * | 9/2008 | Musacchio et al. | ........... | 370/232 |
| 2009/0262744 A1 * | 10/2009 | Fraser | ......................... | 370/395.1 |
| 2010/0202460 A1 * | 8/2010 | Park et al. | ...................... | 370/394 |
| 2010/0238949 A1 * | 9/2010 | Passas et al. | .................... | 370/419 |
| 2010/0316061 A1 * | 12/2010 | Rojas-Cessa et al. | ........ | 370/417 |
| 2010/0329249 A1 * | 12/2010 | Shenoy et al. | ................ | 370/389 |
| 2011/0026532 A1 * | 2/2011 | Rojas-Cessa et al. | ........ | 370/401 |
| 2011/0167191 A1 * | 7/2011 | Olesinski et al. | ............. | 710/316 |

FOREIGN PATENT DOCUMENTS

WO   WO 03081944 A1 * 10/2003

(Continued)

OTHER PUBLICATIONS

On Buffered Clos Switches; S Krishnan—2002.*

(Continued)

*Primary Examiner* — Phirin Sam
*Assistant Examiner* — Hoang-Chuong Vu

(57) ABSTRACT

Examples are disclosed for forwarding data partitioned into one or more cells through at least a portion of a three-stage memory-memory-memory (MMM) input-queued Clos-network (IQC) packet switch. In some examples, each module of the three-stage MMM IQC packet switch includes a virtual queue and a manager that are configured in cooperation with one another to forward cells through at least a portion of the switch. The cells may have been partitioned and stored at an input port for the switch and destined for an output port for the switch.

18 Claims, 15 Drawing Sheets

FOREIGN PATENT DOCUMENTS

WO 2008154390 A1 12/2008

OTHER PUBLICATIONS

Eiji Oki, Zhigang Jing, Roberto Rojas-Cessa, H. Jonathan Chao, Concurrent Round-Robin-Based Dispatching Schemes for Clos-Network Switches, IEEE/ACM Trans. Networking, May 2001, pp. 830-840, vol. 10 No. 6, USA.

Chuan-Bi Lin, Roberto Rojas-Cessa, Module Matching Schemes for Input-Queued Clos-Network Switches, IEEE 2006 Communication Letters, Feb. 1992, pp. 194-196, vol. 11 No. 2, USA.

Roberto Rojas-Cessa, Eiji Oki, H. Jonathan Chao, CIXB-1: Combined Input-One-cell-crosspoint Buffered Switch, Proceedings of IEEE Workshop on High Performance Switching and Routing, May 29-31, 2001, pp. 324-329, Dallas, TX, USA.

Mark J. Karol, Michael G. Hluchyj, Queuing in High-performance Packet-switching, IEEE Journal on Selected Areas of Communications, Dec. 1988, vol. 6, pp. 1587-1597.

Nick McKeown, Adisak Mekkittikul, Venkat Anantharam, Jean Walrand, Achieving 100% Throughput in an Input-queued Switch, IEEE Transactions on Communications., Aug. 1999, vol. 47 No. 8, pp. 1260-1267.

Roberto Rojas-Cessa, Eiji Oki, H. Jonathan Chao, CIXOB-k: Combined Input-Crosspoint-Output Buffered Packet Switch, Proceedings of IEEE Globecom 2001, Nov. 2001, vol. 4, pp. 2654-2660, Dallas, TX, USA.

Wang et al.,"Analysis of the Central Stage Buffered Clos-Network for Packet Switching," May 2005, vol. 2, pp. 1053-1057.

Lin et al., "Module-First Matching Schemes for Scalable Input-Queued Space-Space-Space Clos-Network Packet Switches," IEEE, International Conference on Communication, May 2008, pp. 5669-5673.

Lin et al., "Module Matching Schemes for Input-Queued Clos-Network Packet Switches", IEEE Communications Letters, Feb. 2007, vol. 11, No. 2, pp. 194-196.

Chao et al., "Matching Algorithms for Three-Stage Bufferless Clos Network Switches", IEEE Communications Magazines, Oct. 2003, pp. 46-54.

International Preliminary Report on Patentability for International Application No. PCT/US2010/038161 dated Jan. 31, 2012.

International Search Report and Written Opinion for International Application No. PCT/US2010/038161 mailed on Aug. 4, 2010.

* cited by examiner

1500 A computer program product.

1502 A signal bearing medium.

1504 Instructions for for forwarding data through a portion of a three-stage memory-memory-memory (MMM) input-queued Clos-network (IQC) packet switch, the data received at an input port for the three-stage MMM IQC packet switch, the data partitioned into one or more cells destined for an output port coupled to an output module for the three-stage MMM IQC packet switch, a cell from among the one or more cells forwarded to an input module coupled to the input port, the instructions, which, when executed by logic, cause
the logic to:

select a virtual central module queue maintained at the input module for the three-stage MMM IQC packet switch to identify a selected virtual central module queue, the selected virtual central module queue maintained at the input module to store the cell forwarded from the input port and destined for the output port, selection to be based on an arbitration scheme and also based on whether a virtual output module queue maintained at a central module from among one or more central modules coupled to the input module is available to receive the cell; or forward the cell from the selected virtual central module queue to the virtual output module queue, wherein the virtual output module queue is to be associated with the input module and is also associated with the destination output port for the cell.

| 1506 a computer-readable medium. | 1508 a recordable medium. | 1510 a communications medium. |

FIG. 15

FORWARDING DATA THROUGH A THREE-STAGE CLOS-NETWORK PACKET SWITCH WITH MEMORY AT EACH STAGE

STATEMENT REGARDING FEDERALLY SPONSORED RESEARCH OR DEVELOPMENT

This work was supported in part by National Science Foundation grant number CNS-0435250.

CROSS REFERENCE TO RELATED APPLICATIONS

This application is related to U.S. application Ser. No. 12/485,828, filed by Roberto Rojas-Cessa and Chuan-bi Lin on Jun. 16, 2009 and entitled "Configuring a Three-Stage Clos-Network Packet Switch;" and also related to U.S. application Ser. No. 12/511,424, filed by Roberto Rojas-Cessa and Ziqian Dong on Jul. 29, 2009 and entitled "Forwarding Cells of Partitioned Data Through a Three-Stage Clos-Network Packet Switch with Memory at each Stage."

BACKGROUND

Unless otherwise indicated herein, the approaches described in this section are not prior art to the claims in this application and are not admitted to be prior art by inclusion in this section.

A typical three-stage Clos-network packet switch includes three stages of switch modules assembled to create a packet switch capable of having a large number of ports. These three stages typically include input modules, central modules and output modules. Generally, the more input, central and output modules included in a three-stage Clos-network packet switch, the more ports the switch can support. As a result of an ability to support a variable amount of ports, a three-stage Clos-network packet switch architecture can be considered a scalable switch architecture. Companies that manage communication networks such as Internet service providers or telecommunication service providers may find the scalability of three-stage Clos-network packet switch architectures as an attractive attribute. However, configuring routes to forward data through a three-stage Clos-network packet switch that has been scaled to include a large number of ports can be a complex and slow process.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 15 illustrates a block diagram of an example computer program product.

DETAILED DESCRIPTION

Figure 1:
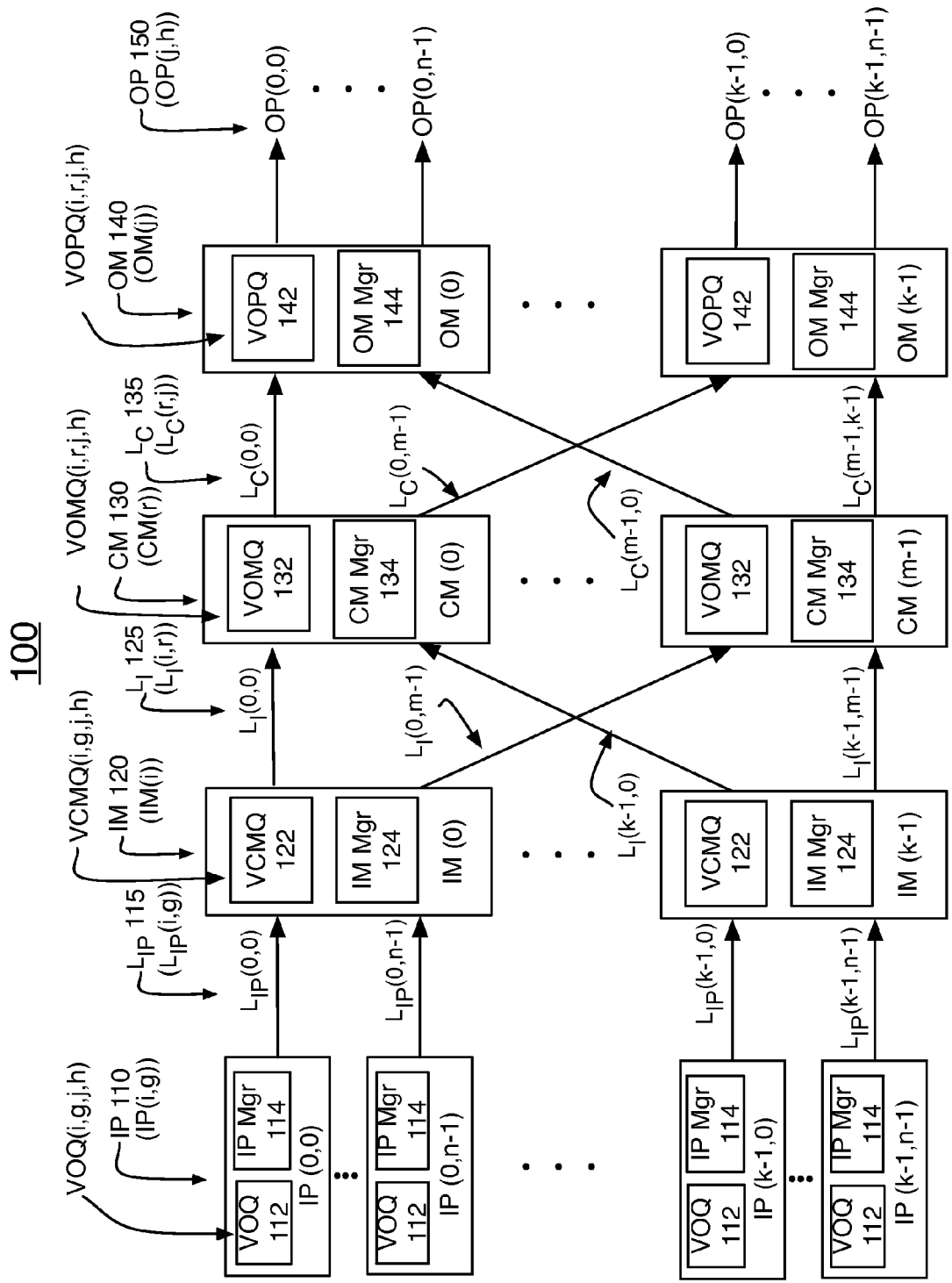
FIG. 1 illustrates an example three-stage Clos-network packet switch with a variable number of ports and modules.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to forwarding data partitioned into one or more cells through a three-stage Clos-network packet switch having memory at each stage.

As contemplated in the present disclosure, forwarding data through a three-stage Clos-network packet switch that has been scaled to include a large number of ports can be a complex and slow process. Certain aspects of the design of a three-stage Clos-network packet switch may impact the complexity and speed at which data is forwarded. For example, a type of three-stage Clos-network packet switch design may be an input-queued Clos-network packet switch ("IQC switch"). An IQC packet switch may include queues or buffers that are maintained at the input ports, hereinafter referred to as "virtual output queues" (VOQs). These VOQs may at least temporarily store data that has been partitioned into packets or "cells" to facilitate internal switching or routing of data through an IQC packet switch. However, an IQC packet switch design may require a complex and possibly time consuming link matching process to configure a route through the IQC packet switch. For example, output port contention and path routing through the three-stages of an IQC packet switch may need to be resolved before a cell may be forwarded through links interconnecting modules of the IQC packet switch.

As further contemplated in the present disclosure, in order to reduce complexity and timing issues associated with configuring routes to forward data through an IQC packet switch, an IQC packet switch may include buffers or queues that are separately maintained at each module. This type of IQC packet switch having memory in all stages (e.g., input module, central module and output module) can be referred to as a three-stage memory-memory-memory ("MMM") IQC packet switch. Separately maintaining buffers or queues at each module may help to resolve internal and output contentions by allowing a separate selection of a queue storing cells to forward a cell at each stage of an MMM IQC packet switch. But out-of-sequence problems may arise as data partitioned into cells may be forwarded through different central modules to arrive at an output module coupled to a destination output port for the MMM IQC packet switch.

In some examples, methods for forwarding data partitioned into one or more cells through a three-stage Clos-network packet switch (e.g., an MMM IQC packet switch) are implemented. According to one of the example methods, a virtual output queue (VOQ) is selected. The selected VOQ may be maintained at an input port coupled to an input module for a three-stage MMM IQC packet switch. The selected VOQ may store data partitioned into one or more cells destined for an output port coupled to an output module for the three-stage MMM IQC packet switch. Selection of the VOQ may be based, at least in part, on whether a virtual central module queue (VCMQ) maintained at the input module is available to receive a cell from among the one or more cells destined for the output port. A cell may then be forwarded from the VOQ to the VCMQ. For this example method, the VCMQ queue may be associated with the input port coupled to the input module and may also be associated with a central module coupled to the input module.

Also, according to the example method, the cell may be received into the VCMQ. The VCMQ may then be selected to forward the cell. The selection may be based on an arbitration scheme (e.g., round-robin) and also may be based on whether a virtual output module queue (VOMQ) maintained at the central module is available to receive the cell. A cell may then be forwarded from the VCMQ to the VOMQ. For this example method, the VOMQ may be associated with the input module and the destination output port for the cell.

Also, according to the example methods, the cell may be received into the VOMQ. The VOMQ may then be selected to forward the cell. Selection may be based on an arbitration scheme (e.g., round-robin) and may be based on whether a virtual output port queue (VOPQ) maintained at the output module is available to receive the cell. A cell may then be forwarded from the VOMQ to the VOPQ. For this example method, the VOPQ may be associated with the central module and with the destination output port for the cell.

Further, according to the example methods, the cell may be received into the VOPQ. The VOPQ may then be selected to forward the cell. Selection may be based on an arbitration scheme (e.g., round-robin). A cell may then be forwarded from the VOPQ to the destination output port.

FIG. 1 illustrates an example three-stage Clos-network packet switch 100 with a variable number of ports and switch modules (e.g., a three-stage MMM IQC packet switch). As illustrated in FIG. 1, switch 100 includes input modules ("IMs") 120 at a first stage, central modules ("CMs") 130 at a second stage, and output modules ("OMs") 140 at a third stage.

In some examples, as depicted in FIG. 1, each IM 120 is coupled to a number (n) of input ports ("IPs") 110 via input port links ("$L_{IP}$") 115. For example, if there are a number (k) of IM 120s, there can be a total of n*k IP 110s. Similarly, each OM 140 includes a number (n) of output ports ("OPs") 150. For example, if there are a number (k) of OM 140's there can be a total of n*k OP 150s.

In some examples, as illustrated in FIG. 1, switch 100 includes a number of (m) CM 130s that are arranged between a number (k) of IM 120s and a number (k) of OM 140s. Also, an IM 120 is shown as including a number (m) of outgoing input module links ("$L_I$") 125. An $L_I$ 125 may be configured to couple an IM 120 to one of the m CM 130s. Similarly, a CM 130 may include a number (k) of outgoing central module links ("$L_C$") 135. An $L_C$ 135 may be configured to couple a CM 130 with one of the k OM 140s.

In some examples, as illustrated in FIG. 1, IP 110s separately include VOQ 112 and IP manager 114. VOQ 112 may be a memory structure arranged to include VOQs configured to at least temporarily store data that has been partitioned into cells to be forwarded through switch 100. In one example, a VOQ 112 may be associated with a destination output port from among OP 150. So for example, if switch 100 included four OP 150's, VOQ 112 would be configured to include four VOQs. Also, as described more below, IP manager 114 may include logic and/or features configured to forward a cell stored in a VOQ separately maintained at each IP 110.

In some examples, as illustrated in FIG. 1, IM 120s separately include virtual central module queue (VCMQ) 122 and IM manager 124. VCMQ 122 may be a memory structure arranged to include VCMQs configured to at least temporarily store one or more cells forwarded from VOQs maintained at an IP 110 coupled to an IM 120. VCMQ 122 may be associated with the IP 110 coupled to the IM 120 and may also be associated with a CM 130. So for example, if switch 100 includes two IP 110s and two CM 130s coupled to an IM 120, VCMQ 122 would be configured to include four VCMQs. Also, as described more below, IM manager 124 may include logic and/or features configured to receive cells into VCMQs included in VCMQ 122 and to also forward one or more cells to a CM 130.

In some examples, as illustrated in FIG. 1, CM 130s separately include virtual output module queue (VOMQ) 132 and CM manager 134. VOMQ 132 may be a memory structure arranged to include VOMQs configured to at least temporarily store one or more cells forwarded from VCMQs maintained at an IM 120 coupled to a CM 130. VOMQ 132 may be associated with the IM 120 coupled to the CM 130 and may also be associated with a destination OP 150 coupled to an OM 140 coupled to the CM 130. So for example, if switch 100 includes two IM 110s coupled to a CM 130 and two OP 150s for each OM 140 coupled to the CM 130, VOMQ 132 would be configured to include eight VOMQs. Also, as described more below, CM manager 134 may include logic and/or features configured to receive cells into VOMQs included in VOMQ 132 and to also forward one or more cells to an OM 140.

In some examples, as illustrated in FIG. 1, OM 140s separately including virtual output port queue (VOPQ) 142 and OM manager 144. VOPQ 142 may be a memory structure arranged to include VOPQs configured to at least temporarily store one or more cells forwarded from VOMQs maintained at a CM 130s coupled to an OM 140. VOPQ 142 may be associated with a CM 130 coupled to the OM 140 and may also be associated with an OP 150. So for example, if switch 100 includes two CM 130s and two OP 150s coupled to the OM 140, VOPQ 142 would be configured to include four VOPQs. Also, as described more below, OM manager 144 may include logic and/or features configured to receive cells into VOPQs included in VOPQ 122 and to also forward one or more cells to an OP 150.

In some examples, OP 150s may separately include logic and/or features configured to further reassemble cells associated with data partitioned and forwarded through switch 100 (e.g., a data flow). The logic and/or features of an OP 150 are not shown. But the logic and/or features configured to reassemble cells are mentioned to indicate that this disclosure contemplates possible reassembly of partitioned cells after cells have been forwarded from a VOPQ maintained at an OM 140.

TABLE 1 includes example descriptions for the variables depicted in FIG. 1.

TABLE 1 n = the number of IP 110 and OP 150 for each IM 120 and OM 140, respectively;
k = the number of IM 120s, as well as the number of OM 140s;
m = the number of CM 130s;
IM(i) = the i + 1$^{th}$ IM 120, where 0 ≦ i ≦ k − 1;
CM(r) = the r + 1$^{th}$ CM 130, where 0 ≦ r ≦ m − 1;
OM(j) = the j + 1$^{th}$ OM 140, where 0 ≦ j ≦ k − 1;
IP(i, g) = the (g + 1)$^{th}$ IP 110 at IM(i), where 0 ≦ g ≦ n − 1;
OP(j, h) = the (h + 1)$^{th}$ OP 150 at OM(j), where 0 ≦ h ≦ n − 1;
$L_{IP}$ (i, g) = the link between IP(i, g) and IM(i);
$L_I$ (i, r) = the link between IM(i) and CM(r);
$L_C$ (r, j) = the link between CM(r) and OM(j);
VOQ(i, g, j, h) = VOQ maintained at IP 110 having an identifier of IP(i, g), the VOQ to store a cell destined for OP 150 with an identifier of OP(j, h);
VCMQ(i, g, r) = VCMQ maintained at IM 120 having an identifier of IM(i), the VCMQ to store a cell forwarded from IP 110 having an identifier of IP(i, g) and to be forwarded to CM 130 having an identifier of CM(r);
VOMQ(i, r, j, h) = VOMQ maintained at CM 130 having an identifier of CM(r), the VOMQ to store a cell forwarded from IM 120 having an identifier of IM(i) and destined for OP 150 with an identifier of OP(j, h); and
VOPQ(r, j, h) = VOPQ maintained at OM 140 having an identifier of OM(j), the VOPQ to store a cell forwarded from CM 130 having an identifier of CM(r) and destined for OP 150 having an identifier of OP(j, h).

Figure 2:
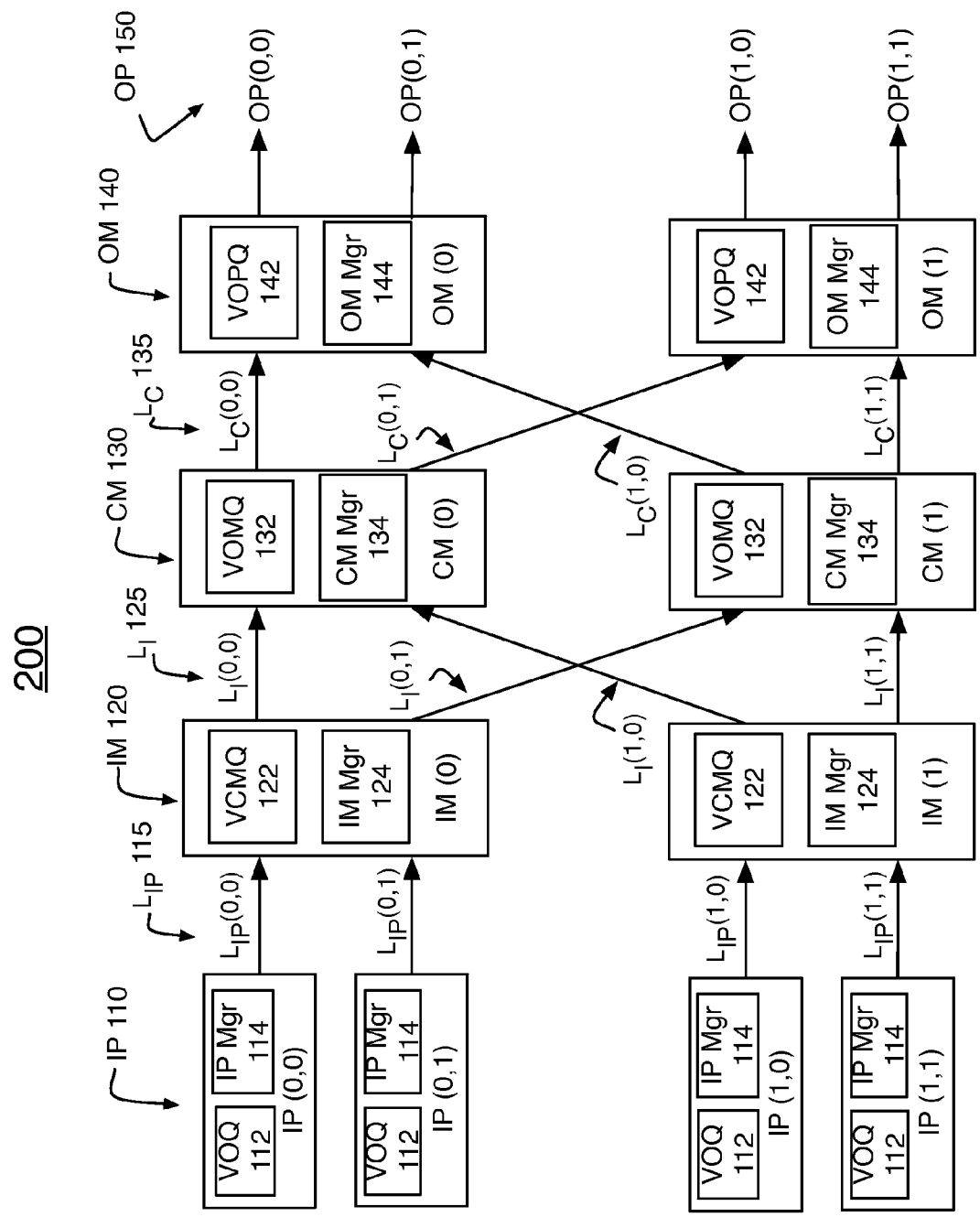
FIG. 2 illustrates an example of a three-stage Clos-network packet switch including a fixed number of ports and modules.

FIG. 2 illustrates an example three-stage Clos-network packet switch 200 with a fixed number of ports and modules (e.g., a three-stage MMM IQC packet switch). Example switch 200 includes a similar architecture as described for switch 100 illustrated in FIG. 1, but has fixed values for variables n, k, and m. The fixed values, for example, are n=2, k=2 and m=2. Since, as mentioned above, N=(n*k), so N=(2*2) or 4. As a result of N=4, switch 200 is illustrated in FIG. 2 as including four IP 110s and four OP 150's. Also, since k=2 and m=2, switch 200 is illustrated as including two IM 120s, two CM 130s and two OM 140s. FIG. 2 also depicts identifiers for elements based on the fixed values of n=2, k=2 and m=2 and using the example variable descriptions shown in TABLE 1 above. Not depicted in FIG. 2 are identifiers for VOQ(i,g,j,h), VCMQ(i,g,r), VOMQ(i,r,j,h) and VOPQ(r,j,h). Identifiers for these queues or buffers maintained at IP 110, IM 120, CM 130 and OM 140, respectively, are depicted in subsequent figures.

Figure 3:
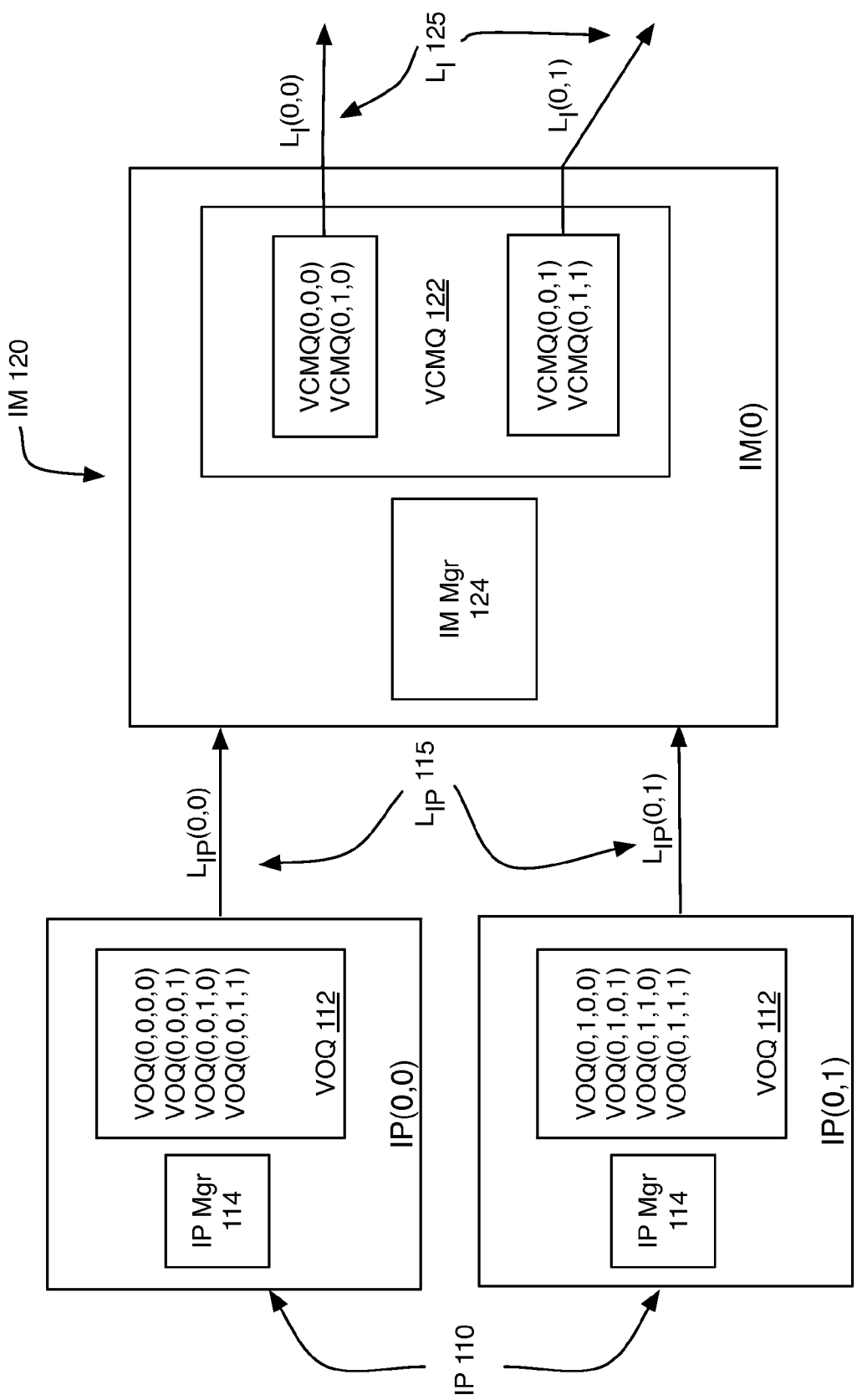
FIG. 3 illustrates a block diagram of an example of two queued input ports coupled to a queued input module for the three-stage Clos-network packet switch.

FIG. 3 illustrates a block diagram of an example of two queued input ports (e.g., IP 110s) coupled to a queued input module (e.g., IM 120) for switch 200 (e.g., the three-stage MMM IQC packet switch 200). As illustrated in FIG. 3, the two IP 110s include IP(0,0) and IP(0,1) coupled to IM(0) via $L_{IP}$(0,0) and $L_{IP}$(0,1), respectively. Also, as illustrated in FIG. 3, IM(0) has $L_I$(0,0) and $L_I$(0,1). As mentioned previously for FIG. 2, IM(0) couples to CM(0) and CM(1) via $L_I$(0,0) and $L_I$(0,1), respectively.

As mentioned above, a VOQ maintained at an IP 110 may be associated with an OP 150. Also, FIG. 2 depicts switch 200 as including four OP 150s. So as illustrated in FIG. 3, VOQ 112 for IP(0,0) may include four VOQs and VOQ 112 for IP(0,1) may also include four VOQs. As listed in TABLE 1, a VOQ may have an identifier. For example, VOQ(0,0,0,0) may be an identifier for a VOQ maintained at IP(0,0) and associated with OP(0,0). Also, VOQ(0,1,0,0) may be an identifier for a VOQ maintained at IP(0,1) and associated with OP(0,0).

Also, as mentioned above, a VCMQ maintained at an IM 120 may be associated with an IP 110 coupled to the IM 120 and also may be associated with a CM 130. Since IM(0) couples to two IP 110s and switch 200 includes two CM 130s, IM(0) is illustrated in FIG. 3 as having a VCMQ 122 that includes four VCMQs. As listed in TABLE 1, a VCMQ may have an identifier. For example, VCMQ(0,0,0) may be an identifier for a VCMQ maintained at IM(0) that is associated with IP(0,0) and CM(0). Also, VCMQ(0,1,1) may be an identifier for a VCMQ maintained at IM(0) and associated with IP(0,1) and CM(1).

Figure 4:
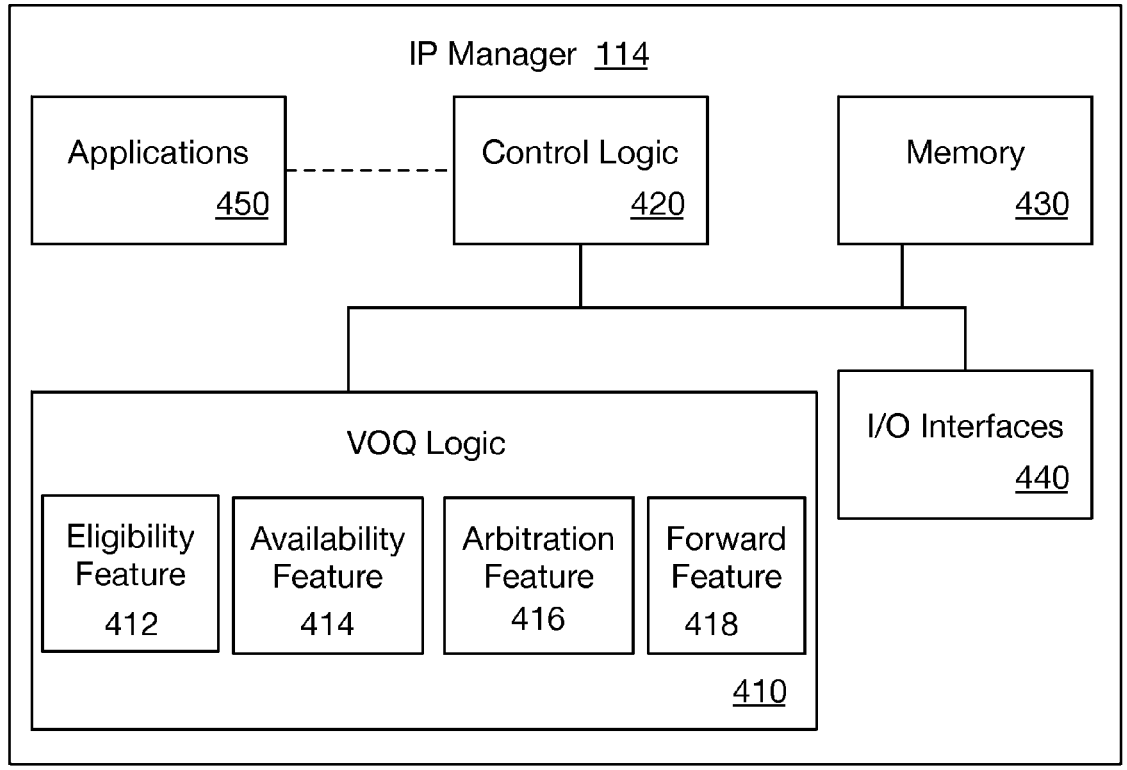
FIG. 4 illustrates a block diagram of an example architecture for an input port manager.

FIG. 4 illustrates a block diagram of an example architecture for input port (IP) manager 114. As described above for switch 100 or switch 200 in FIGS. 1-3, IP 110s separately include an IP manager 114. In some examples, IP manager 114 includes features and/or logic configured or arranged to forward a cell stored in a VOQ maintained at an IP 110.

The example IP manager 114 of FIG. 4, includes VOQ logic 410, control logic 420, memory 430, input/output (I/O) interfaces 440 and optionally one or more applications 450. As illustrated in FIG. 4, VOQ logic 410 is coupled to control logic 420, memory 430 and I/O interfaces 440. Also illustrated in FIG. 4, the optional applications 450 are arranged in cooperation with control logic 420. VOQ logic 410 may further include an eligibility feature 412, a credit feature 414, an arbitration feature 416 and a forward feature 418.

In some examples, the elements portrayed in FIG. 4's block diagram are configured to support or enable IP manager 114 as described in this disclosure. A given IP manager 114 may include some, all or more elements than those depicted in FIG. 4. For example, VOQ logic 410 and control logic 420 may separately or collectively represent a wide variety of logic device(s) to implement the features of IP manager 114. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof. This wide variety of logic device(s) could be located entirely at a given IP 110 or at least a portion of the logic device(s) could be located at other locations of switch 100 or switch 200 (e.g., centrally located, located with IP 110, IM 120, CM 130, OM 140 or a combination thereof).

In some examples, as shown in FIG. 4, VOQ logic 410 includes one or more of an eligibility feature 412, a credit feature 414, an arbitration feature 416 and a forward feature 418. VOQ logic 410 may be configured to use these features to perform operations. As described in more detail below, example operations may include one or more of selecting a VOQ maintained at an IP 110 for forwarding one or more cells stored in the VOQ and forwarding the one or more cells from the selected VOQ to a VCMQ maintained at an IM 120 coupled to the IP 110.

In some examples, control logic 420 may be configured to control the overall operation of IP manager 114. As mentioned above, control logic 420 may represent any of a wide variety of logic device(s) configured to operate in conjunction with executable content to implement the control of IP manager 114. In some alternate examples, the features and functionality of control logic 420 may be implemented within VOQ logic 410.

According to some examples, memory 430 is arranged to store executable content. The executable content may be used by control logic 420 and/or VOQ logic 410 to implement or activate features or elements of IP manager 114. Memory 430 may also be arranged to temporarily maintain VOQ information and selection information obtained by features of VOQ logic 410.

Memory 430 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 440 may provide an interface via an internal communication medium or link between IP manager 114 and elements resident on or located with a given IP 110 (e.g., VOQ 112). I/O interfaces 440 may include interfaces that operate according to various communication protocols to communicate over the internal communication link (e.g., Inter-Integrated Circuit ($I^2C$), System Management Bus (SMBus) or Serial Peripheral Interface Bus (SPI)). I/O interfaces 440 may also provide an interface between IP manager 114 and elements coupled to an IP 110 such as IM 120. As mentioned above for FIG. 1, IP 110s may couple to these elements via links $L_{IP}$ 115. I/O interfaces 440, for example, include an interface configured to operate according to various communication protocols to allow IP manager 114 to communicate over links $L_{IP}$ 115 (e.g., PCIe, PCI-eXtended (PCI-X), Ethernet, Infiniband, StarFabric, RapidIO, etc.).

In some examples, IP manager 114 includes one or more applications 450 to provide instructions to control logic 420 and/or VOQ logic 410.

Figure 5:
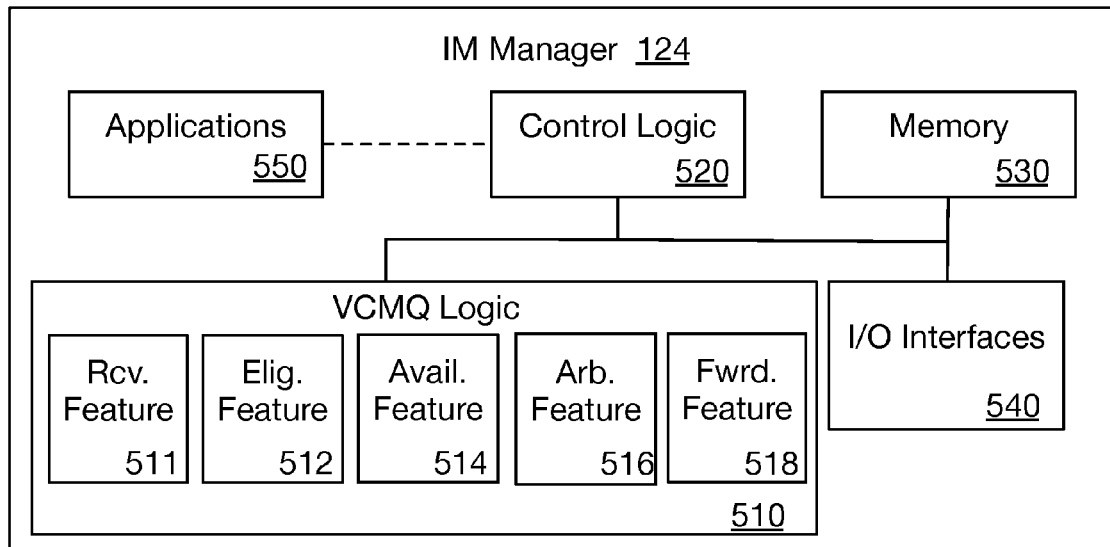
FIG. 5 illustrates a block diagram of an example architecture for an input module manager.

FIG. 5 illustrates a block diagram of an example architecture for an input module (IM) manager 124. As described above for switch 100 or switch 200 in FIGS. 1-3, IM 120s separately include an IM manager 124. In some examples, IM manager 124 includes features and/or logic configured to receive a cell into a VCMQ maintained at an IM 120 and to forward the cell to a CM 130.

The example IM manager 124 of FIG. 5 includes VCMQ logic 510, control logic 520, memory 530, input/output (I/O) interfaces 540 and optionally one or more applications 550. As illustrated in FIG. 5, VCMQ logic 510 is coupled to control logic 520, memory 530 and I/O interfaces 540. Also illustrated in FIG. 5, the optional applications 550 are arranged in cooperation with control logic 520. VCMQ logic 510 may further include one or more of a receive feature 511, an eligibility feature 512, a credit feature 514, an arbitration feature 516 and a forward feature 518.

In some examples, the elements portrayed in FIG. 5's block diagram are those elements to support or enable IM manager 124 as described in this disclosure. A given IM manager 124 may include some, all or more elements than those depicted in FIG. 5. For example, VCMQ logic 510 and control logic 520 may separately or collectively represent a wide variety of logic device(s) to implement the features of IM manager 124. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given IM 120 or at least a portion of the logic device(s) could be located at other locations of switch 200 (e.g., centrally located, located with IP 110, CM 130, OM 140 or a combination thereof).

In some examples, as shown in FIG. 5, VCMQ logic 510 includes receive feature 511, eligibility feature 512, credit feature 514, arbitration feature 516 and forward feature 518. VCMQ logic 510 may be configured to use these features to perform several operations. As described in more detail below, example operations may include one or more of receiving one or more cells into a VCMQ maintained at an IM 120, selecting a VCMQ for forwarding one or more cells stored in the VCMQ and forwarding the one or more cells from the selected VCMQ to a VOMQ maintained at a CM 130 coupled to the IM 120.

In some examples, control logic 520 may be configured to control the overall operation of IM manager 124. As mentioned above, control logic 520 may represent any of a wide variety of logic device(s) configured to operate in conjunction with executable content to implement the control of IM manager 124. In some examples, the features and functionality of control logic 520 may be implemented within VCMQ logic 510.

Similar to memory 430 as described above, memory 530 may include a wide variety of memory media. According to some examples, memory 530 is arranged to store executable content. The executable content may be used by control logic 520 and/or VCMQ logic 510 to implement or activate features or elements of IM manager 124. Memory 530 may also be arranged to temporarily maintain VCMQ information and selection information obtained by features of VCMQ logic 510.

Similar to I/O interface 440 as described above, I/O interfaces 540 may provide an interface via an internal communication medium or link between IM manager 124 and elements resident on or located with a given IM 120 (e.g., VCMQ 122). I/O interfaces 540 may also provide an interface between IM manager 124 and elements coupled to an IM 120 such as IP 110 and CM 130.

In some examples, IM manager 124 includes one or more applications 550 to provide instructions to control logic 520 and/or VCMQ logic 510.

Figure 6:
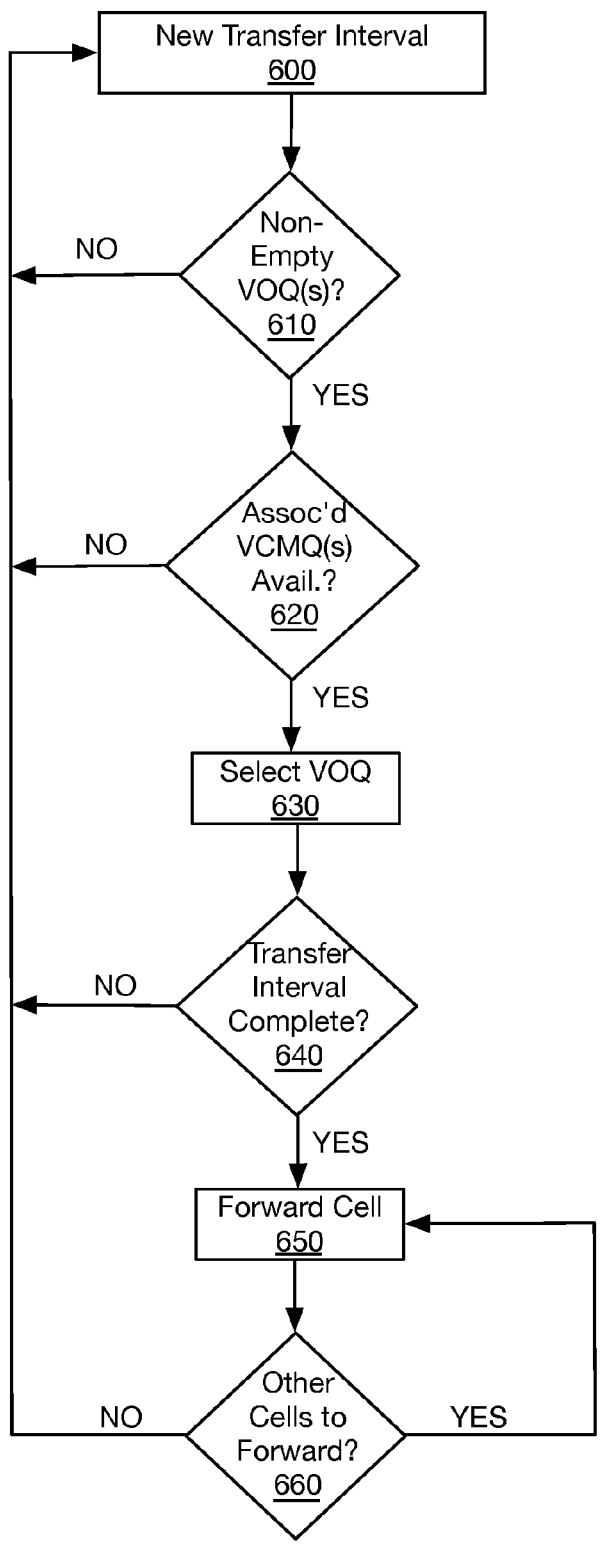
FIG. 6 illustrates a flow chart of example methods for forwarding a cell from a virtual output port queue maintained at an input port coupled to an input module for a three-stage Clos-network packet switch.

FIG. 6 illustrates a flow chart of example methods for forwarding a cell from a virtual output port queue (VOQ) maintained at an input port (IP) 110 (e.g., IP(0,0)) coupled to an input module (IM) 120 for switch 200 (e.g., the three-stage MMM IQC packet switch 200). The same portions of switch 200 as shown in FIGS. 2 and 3, along with the various managers described in FIGS. 4 and 5, are used to illustrate the example methods. But the described methods are not limited to only implementations on switch 200 including the various managers described in FIGS. 4 and 5. The example methods may be implemented on three-stage MMM IQC packet switches that may include managers having one or more of the elements depicted in FIGS. 4 and 5.

Processing begins at block 600 (New Transfer Interval), where a transfer interval has begun. A transfer interval may be a period of time allocated to forward one or more cells of partitioned data through at least a portion of switch 200. In some examples, when a new transfer interval has started, a timer is set. IP manager 114 for IP(0,0), for example, may include logic and/or features configured to set the timer for a period of time that expires at the end or completion of a transfer interval. The period of time to set the time, for example, may include the amount of time taken for one or more cells to be forwarded from a VOQ maintained at an IP 110 to a VCMQ maintained at an IM 120. The amount of time taken for one or more cells to be forwarded may consider a worst-case scenario. The worst-case scenario, for example, accounts for longest possible times to forward the one or more cells due to factors such as possible congestion in switch 200 (e.g., at IP 110 and/or IM 120). Due to a consideration for the worst-case scenario, an example transfer interval should be a period of time that is at least longer that the longest possible time to forward the one or more cells.

Processing continues from block 600 to decision block 610 (Non-Empty VOQ(s)?), where IP manager 114 for IP(0,0) determines (e.g., via eligibility feature 412) whether at least one VOQ of VOQ 112 includes a cell (hereinafter referred to as "non-empty"). In some examples, a determination of whether a VOQ is eligible for selection to forward cells from the VOQ may be based initially on whether the VOQ is non-empty. Processing continues from decision block 610 to decision block 620 if a determination is made that at least one VOQ is non-empty. Otherwise, processing moves from decision block 610 to block 600.

At decision block 620 (Associated VCMQ(s) Available?), the IP manager 114 for IP(0,0) determines (e.g., via availability feature 414) whether at least one VCMQ maintained at IM(0) is available to receive a cell (e.g., has capacity or space to store cells) from a non-empty VOQ. As mentioned previously, a VCMQ is associated with both an IP 110 and a CM 130. Since switch 200 has two CM 130s coupled to IM(0), two VCMQs maintained at IM(0) may be associated with IP(0,0) and are also associated with CM(0) and CM(1), respectively. For example, VCMQ(0,0,0) and VCMQ(0,0,1) are both associated with IP(0,0). Processing continues from decision block 620 to block 630 if a determination is made that an associated VCMQ is available. Otherwise, processing moves from decision block 620 to block 600.

In some examples, a flow control mechanism or scheme may be used to determine availability of a VCMQ. The flow control mechanism may be credit-based. For example, IP manager 114 may have logic configured (e.g., availability feature 414) to maintain (e.g., in memory 430) or track a capacity of a VCMQ to temporarily store one or more cells. Available space may be based on assigning a cell credit to indicate a cell capacity of the VCMQ. When a cell is forwarded to the VCMQ, a credit unit is deducted from the cell credit. A VCMQ becomes unavailable once the cell credit is depleted or has gone to zero. Also, IM manager 124 for IM(0) may include logic configured to indicate to IP manager 114 when a cell is removed or forwarded from the VCMQ. The indication of the cell being removed or forwarded from the VCMQ may result in an addition to the cell credit. An addition to the cell credit may result in the VCMQ becoming available.

Continuing to block 630 (Select VOQ), a non-empty VOQ at IP(0,0) is selected (e.g., via arbitration feature 416) for forwarding of a cell to an associated and available VCMQ at IM(0). If only a single VOQ at IP(0,0) was determined as non-empty in block 610, then that VOQ is selected. However, if more than one VOQ is non-empty, an arbitration scheme may be implemented to select which VOQ to forward the cell. In some examples, the arbitration scheme may include a round-robin arbitration scheme or a longest queue first (e.g., queue having highest number of cells).

Continuing from block 630 to decision block 640 (Transfer Interval Complete?), the process determines (e.g., via forward feature 418) whether a transfer interval has completed. In some examples, completion of a transfer interval is determined based on an expiration of the timer that was set as described above for block 600. Processing moves from decision block 640 to block 650 if the transfer interval has completed. Otherwise, processing moves from decision block 640 to block 600.

At block 650 (Forward Cell), a cell is forwarded from the VOQ selected in block 630 to the associated VCMQ that was determined as available in block 620. As mentioned above, for each cell forwarded to VCMQ a cell unit may be deducted (e.g., via availability feature 414) from a cell count for the VCMQ.

Continuing from block 650 to decision block 660 (Other Cells to Forward?), the process determines (e.g., via forward feature 418) whether other cells are to be forwarded from the selected VOQ to the associated VCMQ. In some examples, a determination is made based on available cell credits to forward cells to the associated VCMQ and based on whether the selected VOQ is still non-empty (has cells remaining). Processing moves from decision block 660 to block 650 if it is determined that other cells are to be forwarded. Otherwise, processing moves from decision block 660 to block 600.

Figure 7:
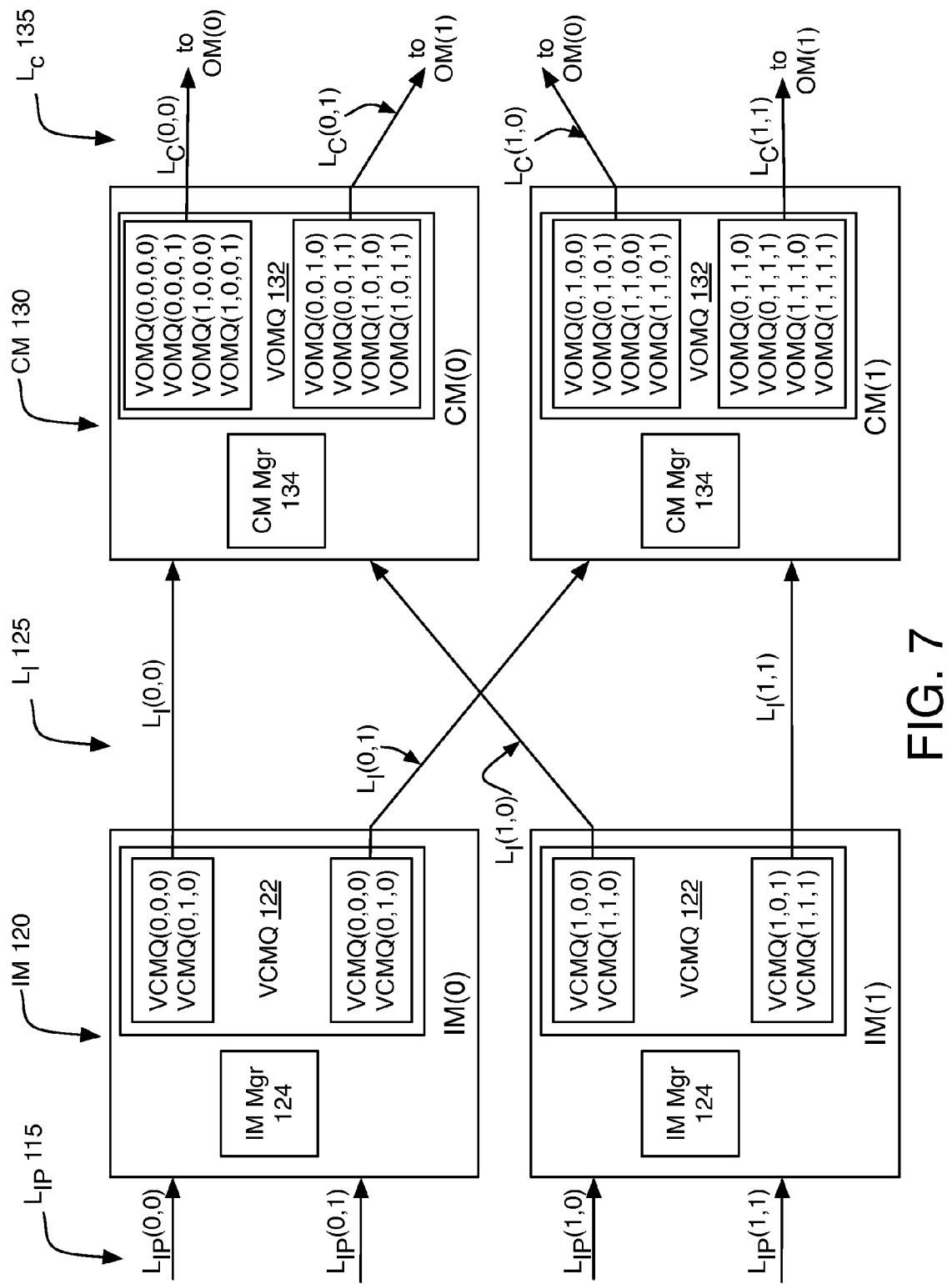
FIG. 7 illustrates a block diagram of an example of two queued input modules coupled to two queued central modules for the three-stage Clos-network packet switch.

FIG. 7 illustrates a block diagram of an example of two queued input modules (IMs) 120 coupled to two queued central modules (CMs) 130 for switch 200 (e.g., the three-stage MMM IQC packet switch 200). As illustrated in FIG. 7, the two IM 120s include IM(0) and IM(1) and the two CM 130s include CM(0) and CM(1). As shown in FIG. 7, IM(0) may couple to CM(0) via $L_I(0,0)$ and to CM(1) via $L_I(0,1)$. Also, IM(1) may couple to CM(0) via $L_I(1,0)$ and to CM(1) via $L_I(1,1)$. In some examples, cells destined for OP 150s coupled to OM(0) or OM(1) may be forwarded from CM(0) via $L_C(0,0)$ or $L_C(0,1)$, respectively. Also, cells destined for OP 150s coupled to OM(0) or OM(1) may be forwarded from CM(1) via $L_C(1,0)$ or $L_C(1,1)$, respectively.

As described above for FIG. 3, IM(0) may include a VCMQ 122 having four VCMQs. The four VCMQs may be associated with IP(0,0) and IP(0,1) and with CM(0) and CM(1) (see FIG. 2). Similarly, as shown in FIG. 7, IM(1) may include a VCMQ 122 having four VCMQs. These four VCMQs may be associated with IP(1,0) and IP(1,1) and as described more below may also be associated with CM(0) and CM(1).

As mentioned above for FIG. 1, a VOMQ maintained at a CM 130 may be associated with an IM 120 coupled to the CM 130 and may also be associated with a destination OP 150. Since FIG. 7 depicts CM(0) and CM(1) separately coupling to two IM 120s and FIG. 2 depicts switch 200 including two OP 150s coupled to each OM 140, CM(0) and CM(1) may separately have a total of eight VOMQs. As listed in TABLE 1, a VOMQ may have an identifier. For example, VOMQ(0,0,0,1) may be an identifier for a VOMQ maintained at CM(0) that is associated with IM(0) and stores one or more cells with a destination of OP(0,1). Similarly, VOMQ(0,1,0,1) may be an identifier for a VOMQ maintained at CM(1) that is associated with IM(0) and stores one or more cells with a destination of OP(0,1).

Figure 8:
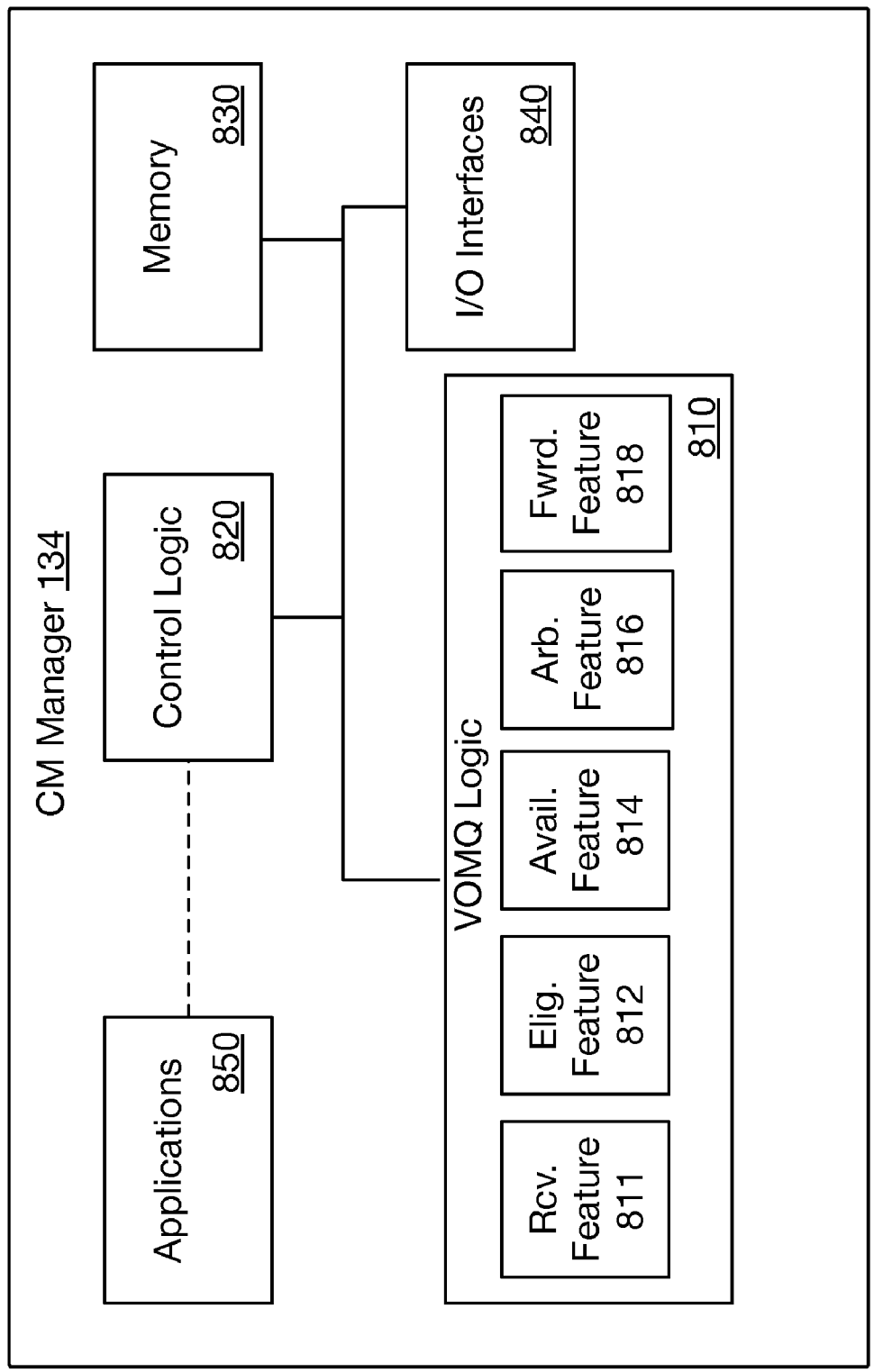
FIG. 8 illustrates a block diagram of an example architecture for a central module manager.

FIG. 8 illustrates a block diagram of an example architecture for a central module (CM) manager 134. As described above for switch 100 or switch 200 in FIGS. 1, 2 and 7, CM 130s separately include a CM manager 134. In some examples, CM manager 134 includes features and/or logic configured to receive a cell into a VOMQ maintained at a CM 130 and to forward the cell to an OM 140.

The example CM manager 134 of FIG. 8 includes VOMQ logic 810, control logic 820, memory 830, input/output (I/O) interfaces 840 and optionally one or more applications 850. As illustrated in FIG. 8, VOMQ logic 810 is coupled to control logic 820, memory 830 and I/O interfaces 840. Also illustrated in FIG. 8, the optional applications 850 are arranged in cooperation with control logic 820. VOMQ logic 810 may further include a receive feature 811, an eligibility feature 812, a credit feature 814, an arbitration feature 816 and a forward feature 818.

In some examples, the elements portrayed in FIG. 8's block diagram are configured to support or enable CM manager 134 as described in this disclosure. A given CM manager 134 may include some, all or more elements than those depicted in FIG. 8. For example, VOMQ logic 810 and control logic 820 may separately or collectively represent a wide variety of logic device(s) to implement the features of CM manager 134. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given CM 130 or at least a portion of the logic device(s) could be located at other locations of a switch 100 or a switch 200 (e.g., centrally located, located with IP 110, IM 120, OM 140 or a combination thereof).

In some examples, as shown in FIG. 8, VOMQ logic 810 includes receive feature 811, eligibility feature 812, credit feature 814, arbitration feature 816 and forward feature 818. VOMQ logic 810 may be configured to use these features to perform several operations. As described in more detail below, example operations may include one or more of receiving one or more cells into a VOMQ maintained at a CM 130, selecting a VOMQ for forwarding one or more cells stored in the VCMQ and forwarding the one or more cells from the selected VOMQ to a VOPQ maintained at an OM 140 coupled to the CM 130.

In some examples, control logic 820 may be configured to control the overall operation of CM manager 134 and as mentioned above, may represent any of a wide variety of logic device(s) configured to operate in conjunction with executable content to implement the control of CM manager 134. In some alternate examples, the features and functionality of control logic 820 may be implemented within VOMQ logic 810.

Similar to memory 430 as described above, memory 830 may include a wide variety of memory media. According to some examples, memory 830 is arranged to store executable content. The executable content may be used by control logic 820 and/or VOMQ logic 810 to implement or activate features or elements of CM manager 134. Memory 830 may also be arranged to temporarily maintain VOMQ information and selection information obtained by features of VOMQ logic 810.

Similar to I/O interface 440 as described above, I/O interfaces 840 provide an interface via an internal communication medium or link between CM manager 134 and elements resident on or located with a given CM 130 (e.g., VOMQ 132). I/O interfaces 840 may also provide an interface between CM manager 134 and elements coupled to a CM 130 such as IM 120 and OM 140.

In some examples, CM manager 134 includes one or more applications 850 to provide instructions to control logic 820 and/or VOMQ logic 810.

Figure 9:
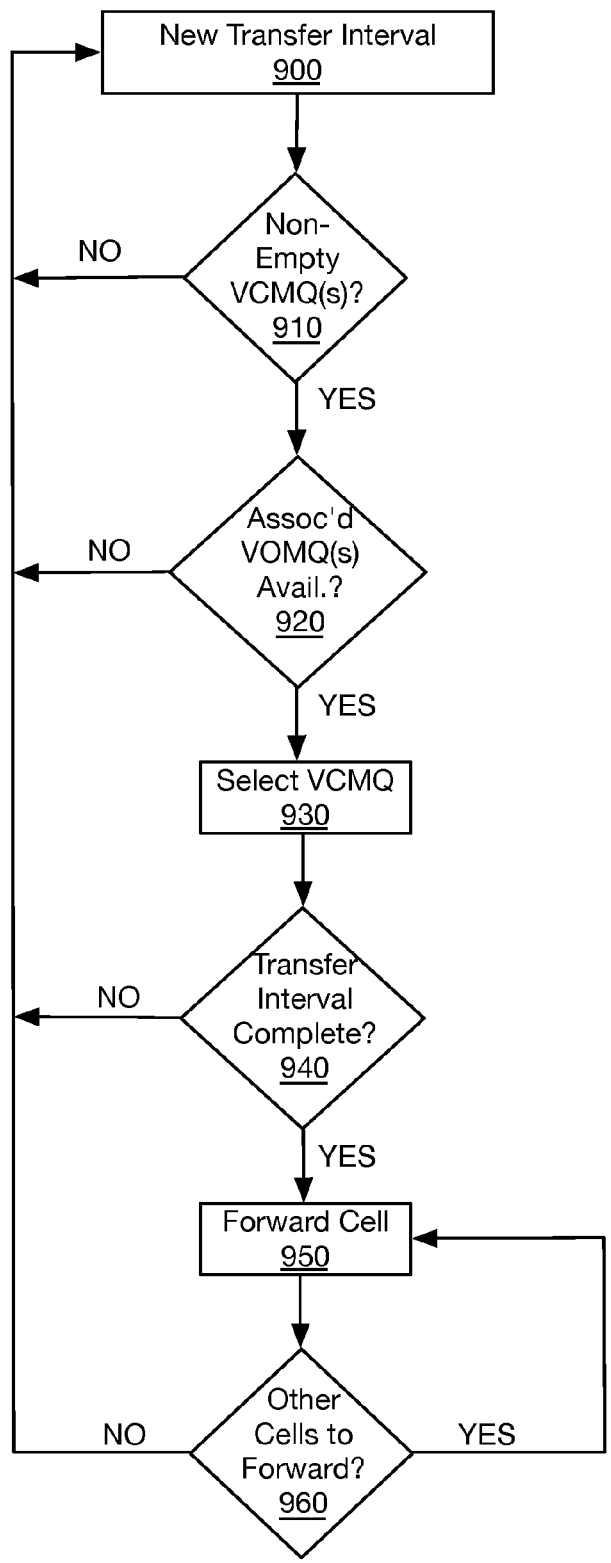
FIG. 9 illustrates a flow chart of example methods for forwarding a cell from a queue maintained at an input module coupled to a central module for a three-stage Clos-network packet switch.

FIG. 9 illustrates a flow chart of example methods for forwarding a cell from a queue (e.g., a VCMQ) maintained at an input module (IM) 120 (e.g., IM(0)) coupled to a central module (CM) 130 for switch 200 (e.g., the three-stage MMM IQC packet switch 200). The same portions of switch 200 as shown in FIGS. 2 and 7, along with the various managers described in FIGS. 5 and 8, are used to illustrate the example methods. But the described methods are not limited to only implementations on switch 200 including the various managers described in FIGS. 5 and 8. The example methods may be implemented on three-stage MMM IQC packet switches that may include managers having one or more of the elements depicted in FIGS. 5 and 8.

Processing begins at block 900 (New Transfer Interval), where a transfer interval has begun. As mentioned above, a transfer interval may be a period of time allocated to forward one or more cells of partitioned data through at least a portion of switch 200. In some examples, when a new transfer interval has started, a timer is set. IM manager 124 for IM(0), for example, may include logic and/or features configured to set the timer for a period of time that expires at the end or completion of a transfer interval. The period of time to set the timer may include the amount of time taken for the one or more cell to be forwarded from a VCMQ maintained at an IM 120 to a VOMQ maintained at a CM 130.

Processing continues from block 900 to decision block 910 (Non-Empty VCMQ(s)?), where IM manager 124 for IM(0) determines (e.g., via eligibility feature 512) whether at least one VCMQ of VCMQ 122 is non-empty. In some examples, a determination of whether a VCMQ is eligible for selection to forward cells from the VCMQ may be based initially on whether the VCMQ is non-empty. Processing continues from decision block 910 to decision block 920 if a determination is made that at least one VCMQ is non-empty. Otherwise, processing moves from decision block 910 to block 900.

At decision block 920 (Associated VOMQ(s) Available?), the IM manager 124 for IM(0) determines (e.g., via availability feature 514) whether at least one VOMQ maintained at CM(0) or CM(1) is available to receive a cell from a non-empty VCMQ. As mentioned previously, a VOMQ is associated with both an IM 120 and an OP 150. Since switch 200 has two CM 130s coupled to IM(0) and four OP 150s, four VOMQs maintained at CM(0) may be associated with IM(0) and four VOMQs maintained at CM(1) may also be associated with IM(0). VOMQ(0,0,0,0), VOMQ(0,0,0,1), VOMQ (0,0,1,0) and VOMQ(0,0,1,1) are examples of the four VOMQs maintained at CM(0). VOMQ(0,1,0,0), VOMQ(0,1,0,1), VOMQ(0,1,1,0) and VOMQ(0,1,1,1) are examples of the four VOMQs maintained at CM(1). Processing continues from decision block 920 to block 930 if a determination is made that an associated VOMQ is available. Otherwise, processing moves from decision block 920 to block 900.

In some examples, a credit-based flow control mechanism or scheme may be used to determine availability of a VOMQ. For example, IM manager 124 may have logic configured (e.g., availability feature 514) to maintain (e.g., in memory 530) or track a capacity or available space of a VOMQ to temporarily store one or more cells. Availability may be based on assigning a cell credit to indicate a cell capacity of the VOMQ. When a cell is forwarded to the VOMQ, a credit unit is deducted from the cell credit. The VOMQ may become unavailable once the cell credit is depleted or has gone to zero. Also, CM manager 134 for CM(0) or CM manager 134 for CM(1) may include logic configured to indicate to IM manager 124 when a cell is removed or forwarded from the VOMQ. The indication of the cell being removed or forwarded from the VOMQ may result in an addition to the cell credit for the VOMQ. An addition to the cell credit may result in the VOMQ becoming available.

Continuing to block 930 (Select VCMQ), a non-empty VCMQ at IM(0) is selected (e.g., via arbitration feature 516) for forwarding of a cell to an associated VOMQ at either CM(0) or CM(1). If only a single VCMQ at IM(0) was determined as non-empty in block 910, then that VCMQ is selected. However, if more than one VCMQ is non-empty, an arbitration scheme may be implemented to select which VCMQ is to be selected.

In some examples, the arbitration scheme may include a round-robin arbitration scheme. The round-robin arbitration scheme may be implemented in such a way as to facilitate keeping a sequence of cells (e.g., a data flow) in-sequence as the cells are forwarded to a destination OP 150 of switch 200. For example, a sequence of cells may received (e.g., via receive feature 511) from a VOQ maintained at IP(0,0) and stored in the two associated VCMQs maintained at IM(0). A round-robin arbitration scheme may begin with a VCMQ having received a cell first and result in the first cell in the sequence being forwarded first. A subsequently received cell in the other VCMQ may then be the next cell forwarded. Therefore, as a result of using the round-robin arbitration scheme, the two cells of the data flow may be maintained in sequence as the cells are forwarded to CM(0) and CM(1). Although this disclosure is not limited to a round-robin arbitration scheme, other types of arbitration schemes may be used to include, but not limited to, weighted round-robin, priority weighted round-robin or other types of arbitration schemes to facilitate keeping a sequence of cells in-sequence as the cells are forwarded to a destination OP 150 of switch 200.

Continuing from block 930 to decision block 940 (Transfer Interval Complete?), the process determines (e.g., via forward feature 518) whether a transfer interval has completed. In some examples, completion of a transfer interval is determined based on an expiration of the timer that was set as described above for block 900. Processing moves from decision block 940 to block 950 if the transfer interval has completed. Otherwise, processing moves from decision block 940 to block 900.

At block 950 (Forward Cell), a cell is forwarded from the VCMQ selected in block 930 to the associated VOMQ that was determined as available in block 920. As mentioned above, for each cell forwarded to a VOMQ, a cell unit may be deducted (e.g., via availability feature 514) from a cell count for the VOMQ.

Continuing from block 950 to decision block 960 (Other Cells to Forward?), the process determines (e.g., via forward feature 518) whether other cells are to be forwarded from the selected VCMQ to the associated VOMQ. In some examples, a determination is made based on available cell credits to forward cells to the associated VOMQ and based on whether the selected VCMQ is still non-empty. Processing moves from decision block 960 to block 950 if it is determined that other cells are to be forwarded. Otherwise, processing moves from decision block 960 to block 900.

Figure 10:
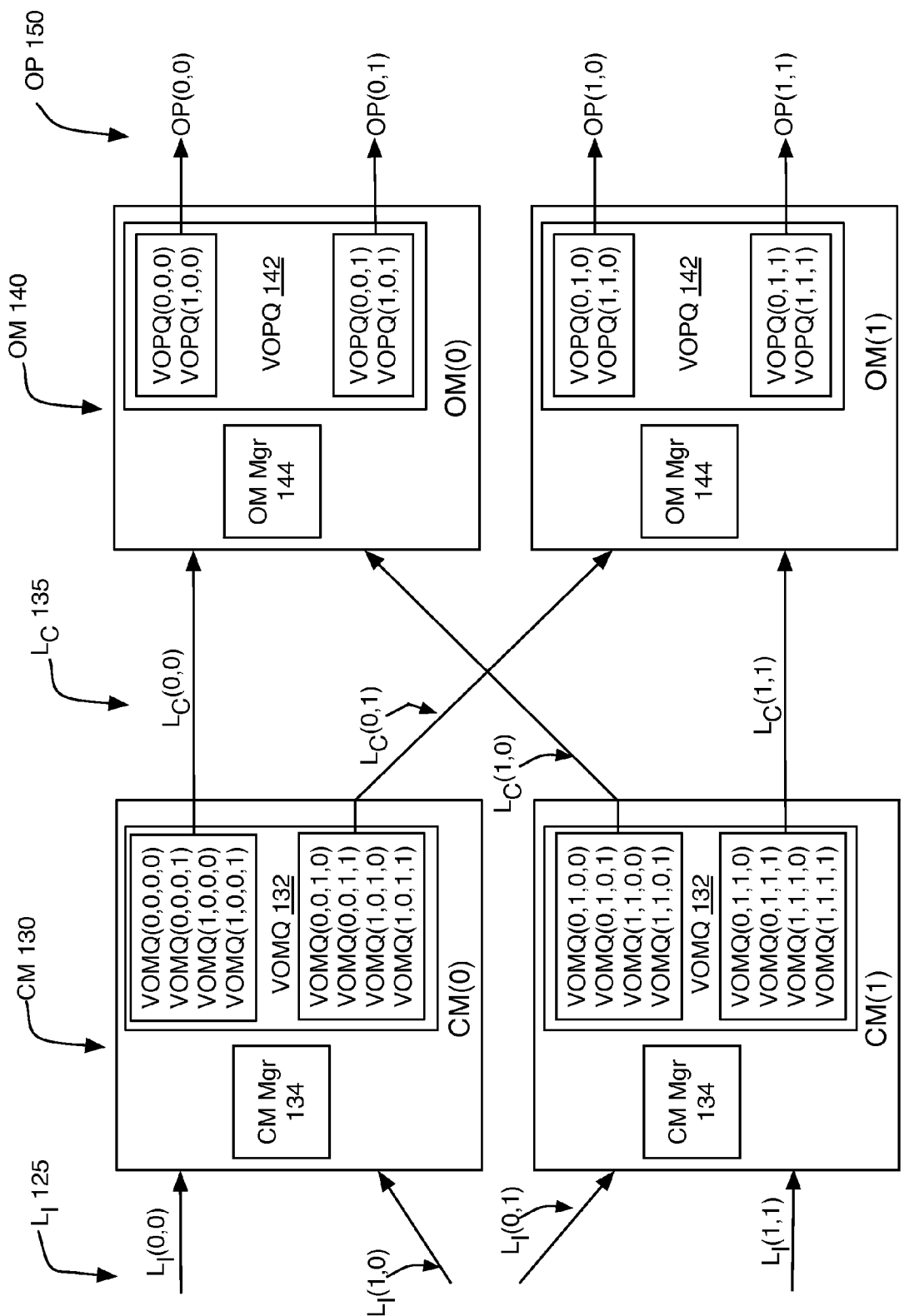
FIG. 10 illustrates a block diagram of an example of two queued central modules coupled to two queued output modules for the three-stage Clos-network packet switch.

FIG. 10 illustrates a block diagram of an example of two queued central modules (CMs) 130 coupled to two queued output modules (OMs) 140 for switch 200 (e.g., the three-stage MMM IQC packet switch 200). As illustrated in FIG. 10, the two CMs include CM(0) and CM(1) and the two OM 140s include OM(0) and OM(1). As shown in FIG. 10, CM(0) may couple to OM(0) via $L_C(0,0)$ and to OM(1) via $L_C(0,1)$. Also, CM(1) may couple to OM(0) via $L_C(1,0)$ and to OM(1) via $L_C(1,1)$. In some examples, cells destined for OP(0,0) or OP(0,1) may be forwarded from CM(0) via $L_C(0,0)$ or from CM(1) via $L_C(1,0)$. Also, cells destined for OP(1,0) or OP(1,1) may be forwarded from CM(0) via $L_C(0,1)$ or from CM(1) via $L_C(1,1)$.

As described for FIG. 7 and shown in both FIG. 7 and FIG. 10, CM(0) and CM(1) may separately include a VOMQ 134 having eight VOMQs. The eight VOMQs separately maintained at CM(0) or CM(1) may be associated with one of IM(0) and IM(1) as wells as one of OP(0,0), OP(0,1), OP(1,0) and OP(1,1).

As mentioned above, a VOPQ maintained at an OM 140 may be associated with a CM 130 coupled to the OM 140 and may also be associated with an OP 150. Since FIG. 10 depicts OM(0) and OM(1) separately coupling to two CM 130s and FIG. 2 and FIG. 10 each depict switch 200 including two OP 150s coupled to each OM 140, OM(0) and OM(1) are shown as separately having a total of four VOPQs. As listed in TABLE 1, a VOPQ may have an identifier. For example, VOPQ(1,0,0) may be an identifier for a VOPQ maintained at OM(0) that is associated with CM(1) and stores one or more cells with a destination of OP(0,0). Also VOPQ(0,1,1) may be an identifier for a VOPQ maintained at OM(1) that is associated with CM(0) and stores one or more cells with a destination of OP(1,1).

Figure 11:
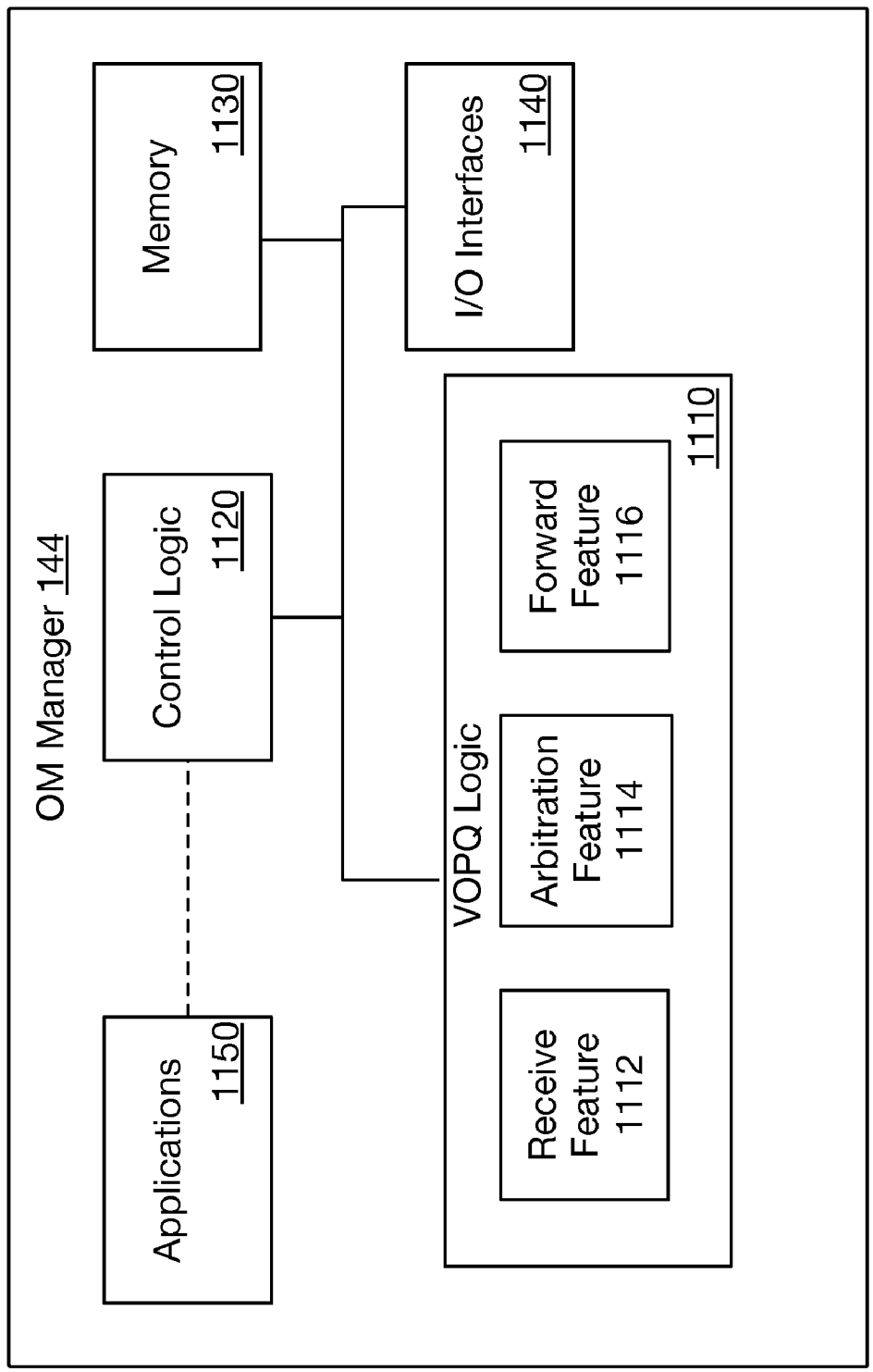
FIG. 11 illustrates a block diagram of an example architecture for an output module manager.

FIG. 11 illustrates a block diagram of an example architecture for an output module (OM) manager 144. As described above for switch 100 or switch 200 in FIGS. 1, 2 and 10, OM 140s separately include an OM manager 144. In some examples, OM manager 144 includes features and/or logic configured to receive a cell into a VOPQ maintained at an OM 140 and to forward the cell to an OP 150.

The example OM manager 144 of FIG. 11 includes VOPQ logic 1110, control logic 1120, memory 1130, input/output (I/O) interfaces 1140 and optionally one or more applications 1150. As illustrated in FIG. 11, VOPQ logic 1110 is coupled to control logic 1120, memory 1130 and I/O interfaces 1140. Also illustrated in FIG. 11, the optional applications 1150 are arranged in cooperation with control logic 1120. VOPQ logic 1110 may further include one or more of a receive feature 1112, an arbitration feature 1114 and a forward feature 1118.

In some examples, the elements portrayed in FIG. 11's block diagram are configured to support or enable OM manager 144 as described in this disclosure. A given OM manager 144 may include some, all or more elements than those depicted in FIG. 12. For example, VOPQ logic 1110 and control logic 1120 may separately or collectively represent a wide variety of logic device(s) to implement the features of OM manager 144. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given OM 140 or at least a portion of the logic device(s) could be located at other locations of switch 200 (e.g., centrally located, located with IP 110, IM 120, CM 130 or a combination thereof).

In one example, as shown in FIG. 11, VOPQ logic 1110 includes receive feature 1112, arbiter feature 1114, and forward feature 1116. VOPQ logic 1110 may use these features to perform operations. As described in more detail below, example operations may include one or more of receiving one or more cells into a VOMQ maintained at OM 140, implementing an arbitration policy, and forwarding one or more cells to a destination OP 150 based on the arbitration policy.

In some examples, control logic 1120 may be configured to control the overall operation of OM manager 144. As mentioned above, control logic 1120 may represent any of a wide variety of logic device(s) configured to operate in conjunction with executable content to implement the control of OM manager 144. In some alternate examples, the features and functionality of control logic 1120 may be implemented within VOPQ logic 1110.

Similar to memory 430 as described above, memory 1130 may include a wide variety of memory media. According to some examples, memory 1130 is arranged to store executable content. The executable content may be used by control logic 1120 and/or VOPQ logic 1110 to implement or activate features or elements of OM manager 144. Memory 1130 may also be arranged to temporarily maintain VOPQ information and selection information obtained by features of VOPQ logic 1110.

Similar to I/O interface 440 as described above, I/O interfaces 1140 may provide an interface via an internal communication medium or link between OM manager 144 and elements resident on or located with a given OM 140 (e.g., VOPQ 142). I/O interfaces 1140 may also provide an interface between OM manager 144 and elements coupled to an OM 140 such as CM 130.

In some examples, OM manager 144 includes one or more applications 1150 to provide instructions to control logic 1120 and/or VOPQ logic 1110.

Figure 12:
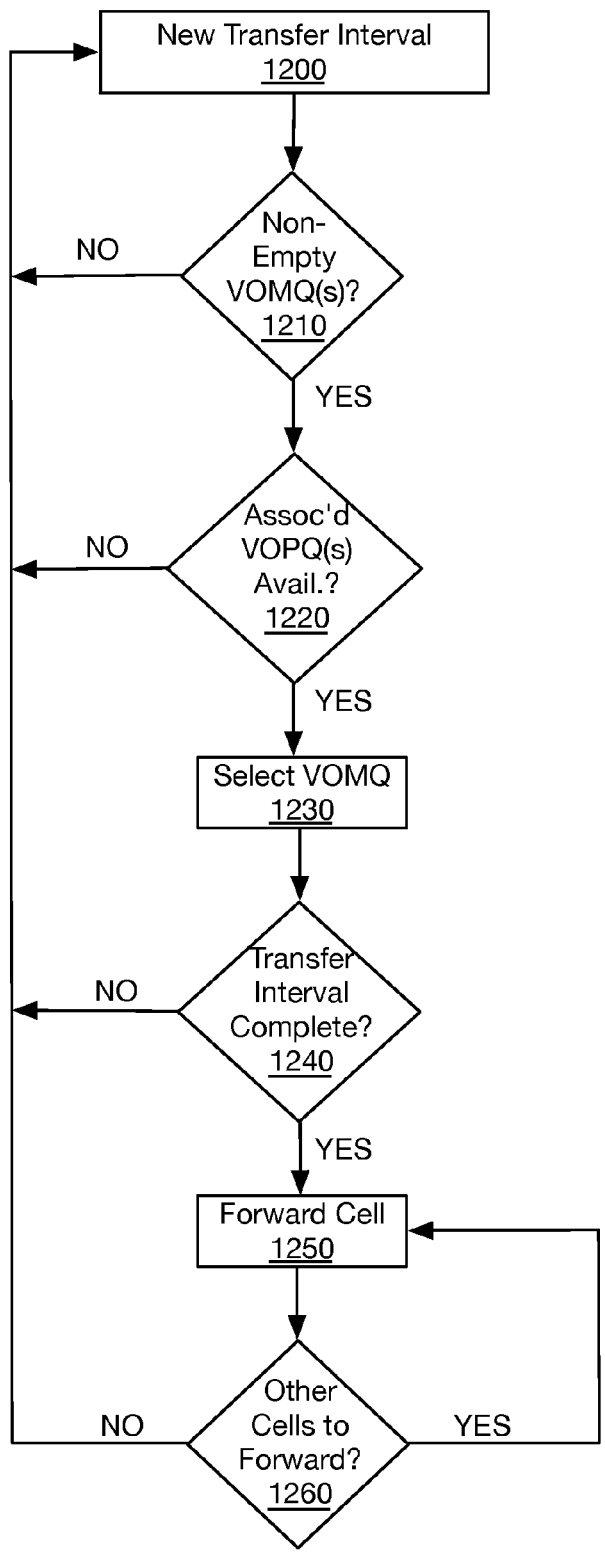
FIG. 12 illustrates a flow chart of example methods for forwarding a cell from a queue maintained at a central module coupled to an output module for a three-stage Clos-network packet switch.

FIG. 12 illustrates a flow chart of example methods for forwarding a cell from a queue (e.g., a VOMQ) maintained at a central module (CM) 130 (e.g., CM(0)) coupled to an output module (OM) 140s for switch 200 (e.g., the three-stage MMM IQC packet switch 200). The same portions of switch 200 as shown in FIGS. 2 and 10, along with the various managers described in FIGS. 8 and 11, are used to illustrate the example methods. But the described methods are not limited to only implementations on switch 200 including the various managers described in FIGS. 8 and 11. The example methods may be implemented on three-stage MMM IQC packet switches that may include managers having one or more of the elements depicted in FIGS. 8 and 11.

Processing begins at block 1200 (New Transfer Interval), where a transfer interval has begun. As mentioned above, a transfer interval may be a period of time allocated to forward one or more cells of partitioned data through at least a portion of switch 200. In some examples, when a new transfer interval has started, a timer is set. CM manager 134 for CM(0), for example, may include logic and/or features configured to set the timer for a period of time that expires at the end or completion of a transfer interval. The period of time to set the timer may include the amount of time taken for the one or more cell to be forwarded from a VOMQ maintained at a CM 130 to a VOPQ maintained at an OM 140.

Processing continues from block 1200 to decision block 1210 (Non-Empty VOMQ(s)?), where CM manager 134 for CM(0) determines (e.g., via eligibility feature 812) whether at least one VOMQ of VOMQ 132 is non-empty. In some examples, a determination of whether a VOMQ is eligible for selection to forward cells from the VOMQ may be based initially on whether the VOMQ is non-empty. Processing continues from decision block 1210 to decision block 1220 if a determination is made that at least one VOMQ is non-empty. Otherwise, processing moves from decision block 1210 to block 1200.

At decision block 1220 (Associated VOPQ(s) Available?), the CM manager 134 for CM(0) determines (e.g., via availability feature 814) whether a VOPQ maintained at OM(0) or OM(1) is available to receive a cell from a non-empty VOMQ. As mentioned previously, a VOPQ is associated with both a CM 130 and a destination OP 150. Since CM(0) includes eight VOMQs and switch 200 includes a total of four OP 150s, separate VOMQs maintained at CM(0) may be associated with separate VOPQs maintained at OM(0) and OM(1). For example, if VOMQ(0,0,0,1) was a non-empty VOMQ, the associated VOPQ would be VOPQ(0,0,1). Also, if VOMQ(1,0,0,0) was a non-empty VOMQ, the associated VOPQ would be VOPQ(0,0,0). Processing continues from decision block 1220 to block 1230 if a determination is made that an associated VOPQ is available. Otherwise, processing moves from decision block 1220 to block 1200.

In some examples, a credit-based flow control mechanism or scheme may be used to determine availability of a VOPQ. For example, CM manager 134 may have logic configured (e.g., availability feature 814) to maintain (e.g., in memory 830) or track a capacity of a VOPQ to temporarily store one or more cells. Availability may be based on assigning a cell credit to indicate a cell capacity of the VOPQ. When a cell is forwarded to the VOPQ, a credit unit is deducted from the cell credit. The VOPQ may become unavailable once the cell credit is depleted or has gone to zero. Also, OM manager 144 for OM(0) or OM manager 144 for OM(1) may include logic configured to indicate to CM manager 124 when a cell is removed or forwarded from a VOPQ. The indication of the cell being removed or forwarded from the VOPQ may result in an addition to the cell credit for the VOPQ. An addition to the cell credit may result in the VOPQ becoming available.

Continuing to block 1230 (Select VOMQ), a non-empty VOMQ at CM(0) is selected (e.g., via arbitration feature 816) for forwarding of a cell to an associated VOPQ at either OM(0) or OM(1). If only a single VOMQ at CM(0) was determined as non-empty in block 1210, then that VOMQ is selected. However, if more than one VOMQ is non-empty, an arbitration scheme may be implemented to select the VOMQ to forward the cell.

In some examples, the arbitration scheme may include a round-robin arbitration scheme. As mentioned above for FIG. 9, a round-robin arbitration scheme may be implemented in such a way as to facilitate keeping a sequence of cells (e.g., a data flow) in-sequence as the cells are forwarded to a destination OP 150 of switch 200. In an example where a data flow of forwarded cells may be forwarded through two different CM 130s of switch 200, implementing a round-robin arbitration at each CM 130 also facilitates keeping the data flow in sequence as the cells are forwarded toward their respective destination OP 150. Since cells at the front of the sequence will be received first into VCMQs maintained at CM 130s, a round-robin arbitration scheme ensures those cells will also be the first cells to be forwarded to an associated VOPQ maintained an OM 140. A round-robin arbitration scheme may then be implemented (e.g., by OM manager 144) for forwarding cells to OP 150s to further maintain the sequence of the cells in the data flow. Although this disclosure is not limited to a round-robin arbitration scheme, other types of arbitration schemes may be used to include, but not limited to, weighted round-robin, priority weighted round-robin or other types of arbitration schemes to facilitate keeping a sequence of cells in-sequence as the cells are forwarded to a destination OP 150 of switch 200.

Continuing from block 1230 to decision block 1240 (Transfer Interval Complete?), the process determines (e.g., via forward feature 818) whether a transfer interval has completed. In some examples, completion of a transfer interval is determined based on an expiration of the timer that was set as described above for block 1200. Processing moves from decision block 1240 to block 1250 if the transfer interval has completed. Otherwise, processing moves from decision block 1240 to block 1200.

At block 1250 (Forward Cell), a cell is forwarded from the VOMQ selected in block 1230 to the associated VOPQ that was determined as available in block 1220. As mentioned above, for each cell forwarded to VOPQ a cell unit may be deducted (e.g., via availability feature 814) from a cell count for the VOMQ.

Continuing from block 1250 to decision block 1260 (Other Cells to Forward?), where it is determined (e.g., via forward feature 818) whether other cells are to be forwarded from the selected VOMQ to the associated VOPQ. In some examples, a determination is made based on available cell credits to forward cells to the associated VOPQ and based on whether the selected VOMQ is still non-empty. Processing moves from decision block 1260 to block 1250 if it is determined that other cells are to be forwarded. Otherwise, processing moves from decision block 1260 to block 1200.

Figure 13:
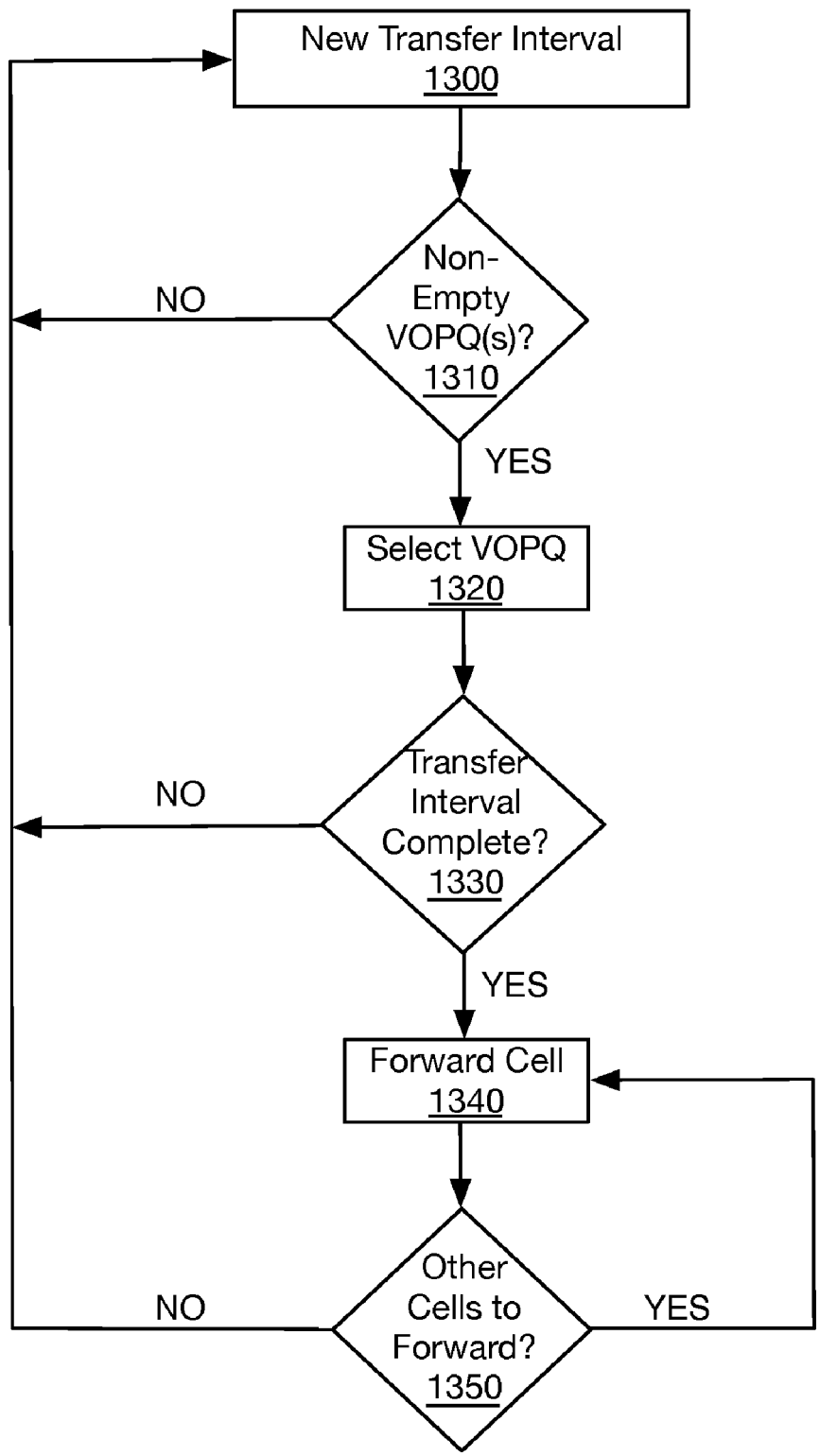
FIG. 13 illustrates a flow chart of example methods for forwarding a cell from a queue maintained at an output module to an output port for a three-stage Clos-network packet switch.

FIG. 13 illustrates a flow chart of example methods for forwarding a cell from a queue (e.g., a VOPQ) maintained at an output module (OM) 150 (e.g., CM(0)) coupled to OP 150s (e.g., OP(0,0) or OP(0,1)) for switch 200 (e.g., the three-stage MMM IQC packet switch 200). The same portions of switch 200 as shown in FIGS. 2 and 10, along with the manager described in FIG. 11, are used to illustrate the example methods. But the described methods are not limited to only implementations on switch 200 including the manager described in FIG. 11. The example methods may be implemented on three-stage MMM IQC packet switches that may include a manager having one or more of the elements depicted in FIG. 11.

Processing begins at block 1300 (New Transfer Interval), where a transfer interval has begun. As mentioned above, a transfer interval may be a period of time allocated to forward one or more cells of partitioned data through at least a portion of switch 200. In some examples, when a new transfer interval has started, a timer is set. OM manager 144 for OM(0), for example, may include logic and/or features configured to set the timer for a period of time that expires at the end or completion of a transfer interval. The period of time to set the timer may include the amount of time taken for the one or more cells to be forwarded from a VOPQ maintained at an OM 140 to an OP 150.

Processing continues from block 1300 to decision block 1310 (Non-Empty VOPQ(s)?), where OM manager 144 for OM(0) determines (e.g., via arbitration feature 1112) whether at least one VOPQ of VOPQ 142 is non-empty. In some examples, a determination of whether a VOPQ is eligible for selection to forward cells from the VOPQ may be based initially on whether the VOPQ is non-empty. Processing continues from decision block 1310 to block 1320 if a determination is made that at least one VOPQ is non-empty. Otherwise, processing moves from decision block 1310 to block 1300.

At block 1320 (Select VOPQ), a non-empty VOPQ at OM(0) is selected (e.g., via arbitration feature 1114) for forwarding of a cell to an associated OP 150. If only a single VOPQ at OM(0) was determined as non-empty in block 1310, then that VOPQ is selected. However, if more than one VOPQ is non-empty, an arbitration scheme may be implemented to select which VOPQ to forward the cell.

In some examples, the arbitration scheme may include a round-robin arbitration scheme. As mentioned above for FIGS. 9 and 12, a round-robin arbitration scheme may be implemented in such a way as to facilitate keeping a sequence of cells (e.g., a data flow) in-sequence as the cells are forwarded to a destination OP 150 of switch 200. For example, a first portion of a data flow destined for OP(0,0) may have been received (e.g., via receive feature 1112) from a VOMQ maintained at CM(0) and stored in the VOPQ associated with CM(0) and OP(0,0), e.g., VOPQ(0,0,0). Subsequently, a second portion of the data flow destined for OP(0,0) may have been received from a VOMQ maintained at CM(1) and stored in the VOPQ associated with CM(1) and OP(0,0), e.g., VOPQ (1,0,0). A round-robin arbitration scheme may begin with the first portion of the data flow received into VOPQ(0,0,0) being forwarded first to OP(0,0). Subsequently, the second portion of the data flow received into VOPQ(1,0,0) may then be forwarded to OP(0,0). Therefore, as a result of using the round-robin arbitration scheme, the two portions of the data flow may be maintained in sequence as the portions of the data flow are forwarded to OP(0,0). Although this disclosure is not limited to a round-robin arbitration scheme, other types of arbitration schemes may be used to include, but not limited to, weighted round-robin, priority weighted round-robin or other types of arbitration schemes to facilitate keeping a sequence of cells in-sequence as the cells are forwarded to a destination OP 150 of switch 200.

Continuing from block 1320 to decision block 1330 (Transfer Interval Complete?), the process determines (e.g., via forward feature 1116) whether a transfer interval has completed. In some examples, completion of a transfer interval is determined based on an expiration of the timer that was set as described above for block 1300. Processing moves from decision block 1330 to block 1340 if the transfer interval has completed. Otherwise, processing moves from decision block 1330 to block 1300.

At block 1340 (Forward Cell), a cell is forwarded from the VOPQ selected in block 1320 to the associated OP 150.

Continuing from block 1340 to decision block 1350 (Other Cells to Forward?), the process determines (e.g., via forward feature 1116) whether other cells are to be forwarded from the selected VOPQ to the associated OP 150. In some examples, a determination is based on whether the selected VOPQ is still non-empty (has cells remaining) Processing moves from decision block 1350 to block 1340 if it is determined that other cells are to be forwarded. Otherwise, processing moves from decision block 1350 to block 1300.

Figure 14:
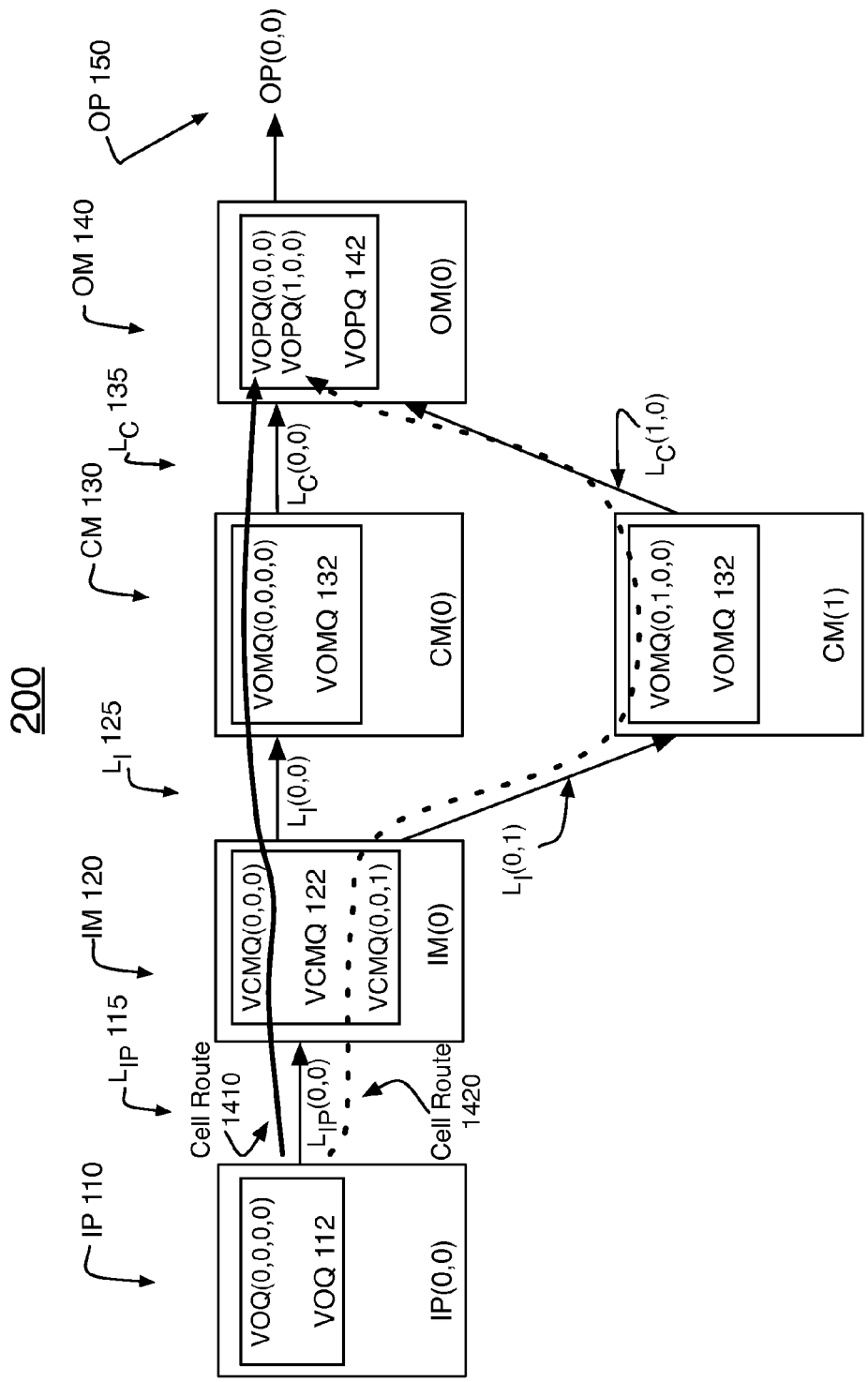
FIG. 14 illustrates example cell routes to forward a cell through the three-stage Clos-network packet switch.

FIG. 14 illustrates example cell routes 1410 and 1420 to forward a cell through the switch 200 (e.g., the three-stage MMM IQC packet switch 200). The example illustration of FIG. 14 does not include certain elements depicted in FIGS. 2, 3, 7 and 10 for switch 200. This is to simplify the depiction of example cell routes 1410 and 1420. Cell routes 1410 and 1420 illustrate example cell routes that a data flow may follow as one or more cells for the data flow, originally stored at a VOQ maintained at IP(0,0), are forwarded to an example destination of OP(0,0). Cell route 1410 is depicted in FIG. 14 as a solid-line and cell route 1420 is depicted as a dotted-line.

In some examples, data is received by switch 200. The data may be partitioned into a sequence of cells (e.g., a data flow) and forwarded through switch 200. Cell routes 1410 and 1420 indicate examples of how cells of the data flow may follow different routes through switch 200. As mentioned previously, logic at each stage of switch 200 may be configured or arranged to forward the cells through switch 200 such that the cells of the data flow may exit switch 200 at OP(0,0) in the sequence in which the data was partitioned into cells.

According to some examples, one or more cells from a data flow are forwarded between queues separately maintained at elements of switch 200 in response to a transfer interval. For example, as illustrated in FIG. 14, a cell from a portion of a data flow may be forwarded via cell route 1410. So in response to a first transfer interval a cell is forwarded from VOQ(0,0,0,0) maintained at IP(0,0) to VCMQ(0,0,0) maintained at IM(0). Then, in response to a second transfer interval, the cell is forwarded to VOMQ(0,0,0,0) maintained at CM(0). Further, in response to a third transfer interval the cell is forwarded to VOPQ(0,0,0). Finally, in response to a fourth transfer interval the cell is forwarded to the cell's destination of OP(0,0).

First, second, third and fourth transfer intervals are described to merely indicate a timing event from the perspective of a given cell. Thus, other cells from the same or different data flow may be forwarded via different cell routes (e.g., cell route 1420) in response to at least some of the same first, second, third and fourth intervals. Also, other transfer intervals for other cells being forwarded through switch 200 may occur before, in-between or after the first, second, third and fourth transfer intervals.

FIG. 15 illustrates a block diagram of an example computer program product 1500. In one embodiment, as shown in FIG. 15, computer program product 1500 includes a signal bearing medium 1502 that may also include instructions 1504. In some examples, instructions 1504 for forwarding data partitioned into one or more cells through a three-stage Clos-network packet switch (e.g., a three-stage MMM IQC packet switch 100 or a three-stage MMM IQC packet switch 200), which, when executed by logic associated with an input module (e.g., VCMQ logic 510) cause the logic to select a VCMQ maintained at the input module to identify a selected VCMQ. The selected VCMQ to store data partitioned into one or more cells destined for an OP coupled to an OM for the three-stage MMM IQC packet switch. The selection may be based on an arbitration scheme and based on whether a VOMQ maintained at a CM from among one or more CMs coupled to the IM is available to receive a cell forwarded from the VCMQ. Instructions 1504 may further cause the logic to forward the cell from the selected VCMQ to the VOMQ in response to a transfer interval. The VOMQ may be associated with the IM and also may be associated with the destination OP for the cell.

Also depicted in FIG. 15, some examples may include one or more of a computer readable medium 1506, a recordable medium 1508 and a communications medium 1510. The dotted boxes around these elements depict different types of mediums included within, but not limited to, signal bearing medium 1502. These types of mediums may distribute instruction 1504 to be executed by logic associated with an input module. Computer readable medium 1506 and recordable medium 1508 may include, but are not limited to, a flexible disk, a hard disk drive (HDD), a Compact Disc (CD), a Digital Video Disk (DVD), a digital tape, a computer memory, etc. Communications medium 1510 may include, but is not limited to, a digital and/or an analog communication medium (e.g., a fiber optic cable, a waveguide, a wired communication link, a wireless communication link, etc.).

Figure 16:
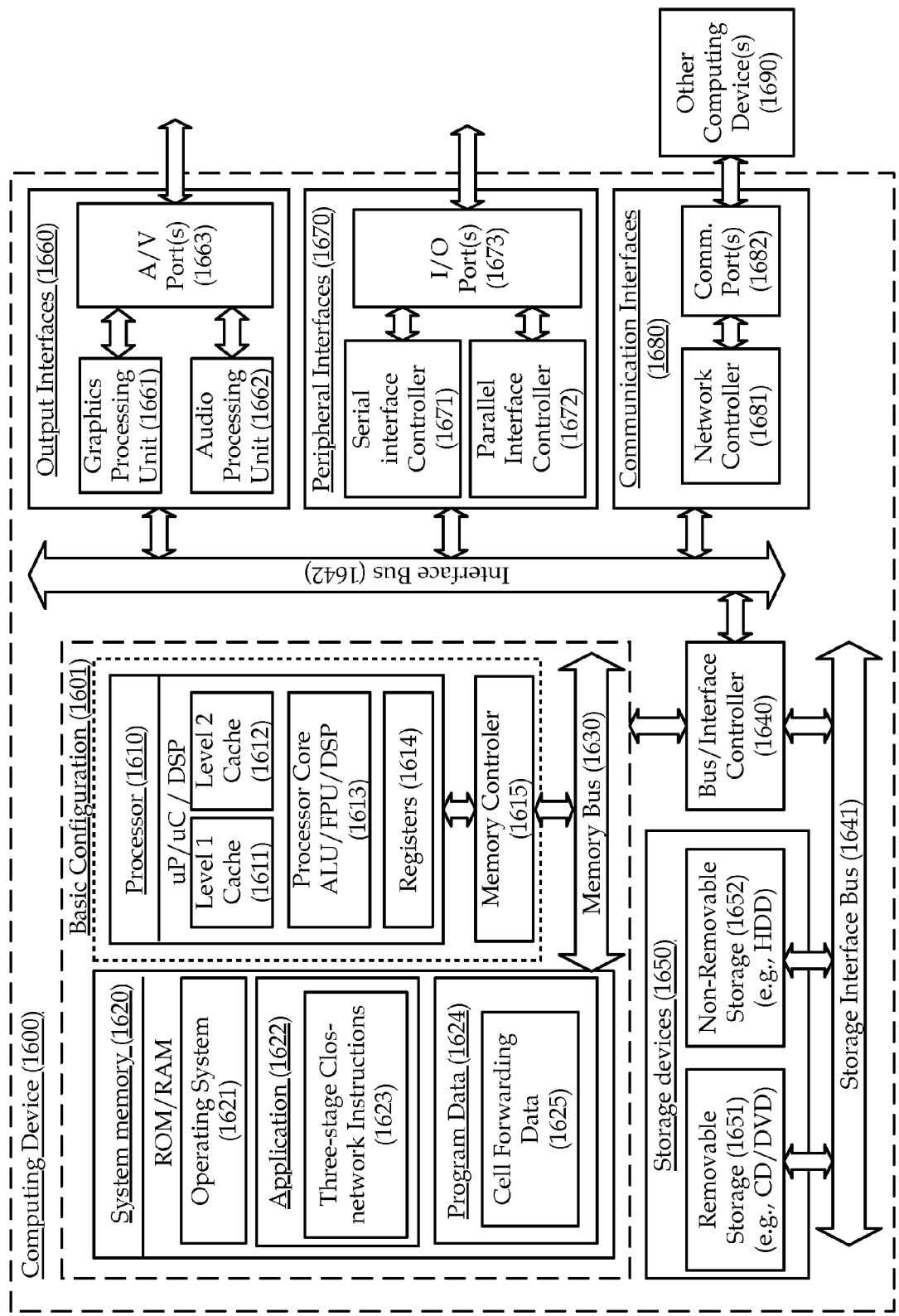
FIG. 16 illustrates an example computing device, all arranged in accordance with the present disclosure.

FIG. 16 illustrates an example computing device 1600 that is arranged for forwarding data partitioned into one or more cells through a three-stage Clos-network packet switch (e.g., a three-stage MMM IQC packet switch) in accordance with the present disclosure. In a very basic configuration 1601, computing device 1600 typically includes one or more processors 1610 and system memory 1620. A memory bus 1630 can be used for communicating between the processor 1610 and the system memory 1620.

Depending on the desired configuration, processor 1610 can be of any type including but not limited to a microprocessor (µP), a microcontroller (µC), a digital signal processor (DSP), or any combination thereof. Processor 1610 can include one more levels of caching, such as a level one cache 1611 and a level two cache 1612, a processor core 1613, and registers 1614. The processor core 1613 can include an arithmetic logic unit (ALU), a floating point unit (FPU), a digital signal processing core (DSP Core), or any combination thereof. A memory controller 1615 can also be used with the processor 1610, or in some implementations the memory controller 1615 can be an internal part of the processor 1610.

Depending on the desired configuration, the system memory 1620 can be of any type including but not limited to volatile memory (such as RAM), non-volatile memory (such as ROM, flash memory, etc.) or any combination thereof. System memory 1620 typically includes an operating system 1621, one or more applications 1622, and program data 1624. Application 1622 includes three-stage Clos-network instructions 1623 that are arranged to perform the functions as described herein including the actions described with respect to the functions described for the manager architectures shown in FIGS. 4, 5, 8 and 11 or including the actions described with respect to the flow charts shown in FIGS. 6, 9, 12 and 13. Program Data 1624 includes cell forwarding data 1625 that is useful for implementing instructions 1623 (e.g., maintaining cell count credits, implementing arbitration schemes, etc.). In some examples, application 1622 can be arranged to operate with program data 1624 on an operating system 1621 such that implementations of forwarding data partitioned into one or more cells through a three-stage MMM IQC packet switch may be provided as described herein. This described basic configuration is illustrated in FIG. 16 by those components within dashed line 1601.

Computing device 1600 can have additional features or functionality, and additional interfaces to facilitate communications between the basic configuration 1601 and any required devices and interfaces. For example, a bus/interface controller 1640 can be used to facilitate communications between the basic configuration 1601 and one or more data storage devices 1650 via a storage interface bus 1641. The data storage devices 1650 can be removable storage devices 1651, non-removable storage devices 1652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1620, removable storage 1651 and non-removable storage 1652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media can be part of device 1600.

Computing device 1600 can also include an interface bus 1642 for facilitating communication from various interface devices (e.g., output interfaces, peripheral interfaces, and communication interfaces) to the basic configuration 1601 via the bus/interface controller 1640. Example output interfaces 1660 include a graphics processing unit 1661 and an audio processing unit 1662, which can be configured to communicate to various external devices such as a display or speakers via one or more A/V ports 1663. Example peripheral interfaces 1660 include a serial interface controller 1671 or a parallel interface controller 1672, which can be configured to communicate with external devices such as input devices (e.g., keyboard, mouse, pen, voice input device, touch input device, etc.) or other peripheral devices (e.g., printer, scanner, etc.) via one or more I/O ports 1673. An example communication interface 1680 includes a network controller 1681, which can be arranged to facilitate communications with one or more other computing devices 1690 over a network communication via one or more communication ports 1682.

In some examples, computing devices 1690 may include all or at least a portion of one or more interconnected modules and/or ports included in a three-stage MMM IQC packet switch as shown in FIG. 1 (e.g., IP 110, IM 120, CM 130, OM 140, OP 150). A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., switches, input ports, input modules, central modules, output modules, output ports, computing device, etc) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for forwarding data through a portion of a three-stage memory-memory-memory (MMM) input-queued Clos-network (IQC) packet switch, the data received at an input port for the three-stage MMM IQC packet switch, the data partitioned into one or more cells destined for an output port coupled to an output module for the three-stage MMM IQC packet switch, a cell from among the one or more cells forwarded to an input module coupled to the input port, the method comprising:

selecting a virtual central module queue maintained at the input module to identify a selected virtual central module queue, the selected virtual central module queue maintained at the input module to store the cell forwarded from the input port and destined for the output port, wherein the selection is based on an arbitration scheme and also based on implementing a credit based flow control mechanism to determine whether a virtual output module queue maintained at a central module from among one or more central modules coupled to the input module is available to receive the cell; and forwarding the cell from the selected virtual central module queue to the virtual output module queue, the virtual output module queue being associated with the input module and also being associated with the destination output port for the cell, wherein implementing the credit-based flow control mechanism includes:

subtracting a credit unit based on forwarding the cell to the virtual output module queue; and adding the credit unit based on forwarding the cell to a virtual output port queue maintained at the output module coupled to the destination output port, wherein the credit unit is subtracted or added to a cell credit indicating a capacity of the virtual output module queue to store data partitioned into one or more cells.

2. A method according to claim 1, wherein the arbitration scheme comprises a round-robin arbitration scheme.

3. A method for forwarding data through a three-stage memory-memory-memory (MMM) input-queue Clos-network (IQC) packet switch, the method comprising:

selecting a virtual output queue maintained at an input port coupled to an input module for the three-stage MMM IQC packet switch to identify a selected virtual output queue, the selected virtual output queue to store data partitioned into one or more cells destined for an output port coupled to an output module for the MMM IQC packet switch, wherein the selection is based on whether a virtual central module queue maintained at the input module is available to receive a cell from among the one or more cells destined for the output port and implementing a credit-based flow control mechanism to determine whether the virtual central module queue is available to receive the cell, the credit based flow control mechanism includes subtracting a credit unit based on forwarding the cell to the virtual central module queue and adding the credit unit based on forwarding the cell to the virtual output module queue, wherein the credit unit is subtracted or added to a cell credit indicating a capacity of the virtual central module queue to store data partitioned into one or more cells;

forwarding the cell from the selected virtual output queue to the virtual central module queue, wherein the virtual central module queue is associated with the input port coupled to the input module and also associated with a central module coupled to the input module;

receiving the cell into the virtual central module queue and selecting the virtual central module queue to forward the cell, wherein the selection is based on an arbitration scheme and also based on whether a virtual output module queue maintained at the central module is available to receive the cell;

forwarding the cell from the virtual central module queue to the virtual output module queue, wherein the virtual output module queue is associated with the input module and also associated with the destination output port for the cell;

receiving the cell into the virtual output module queue and selecting the virtual output module queue to forward the cell, wherein the selection is based on the arbitration scheme and also based on whether a virtual output port queue maintained at the output module is available to receive the cell;

forwarding the cell from the virtual output module queue to the virtual output port queue, wherein the virtual output port queue is associated with the central module and also associated with the destination output port for the cell;

receiving the cell into the virtual output port queue and selecting the virtual output port queue to forward the cell to the destination output port, wherein the selection is based on the arbitration scheme; and forwarding the cell from the virtual output port queue to the destination output port.

4. A method according to claim 3, wherein the arbitration scheme comprises a round-robin arbitration scheme.

5. A method according to claim 3, wherein selecting the virtual output module queue further comprises implementing a credit-based flow control mechanism to determine whether the virtual output module queue is available to receive the cell.

6. A method according to claim 3, wherein selecting the virtual output port queue further comprises implementing a credit-based flow control mechanism to determine whether the virtual output port queue is available to receive the cell.

7. A method according to claim 6, wherein implementing the credit-based flow control mechanism includes subtracting a credit unit based on forwarding the cell to the virtual output port queue and adding the credit unit based on forwarding the cell to the destination output port, wherein the credit unit is subtracted or added to a cell credit indicating a capacity of the virtual output port queue to store data partitioned into one or more cells.

8. An apparatus to forward data through a portion of a three-stage memory-memory-memory (MMM) input-queued Clos-network (IQC) packet switch, the data received at an input port for the three-stage MMM IQC packet switch, the data partitioned into one or more cells destined for an output port coupled to an output module for the three-stage MMM IQC packet switch, a cell from among the one or more cells forwarded to an input module coupled to the input port, the apparatus comprising:

an input module manager for the input module including logic, the logic configured to:

select a virtual central module queue maintained at the input module to identify a selected virtual central module queue, the selected virtual central module queue maintained at the input module to store the cell forwarded from the input port and destined for the output port, wherein the selection is based on an arbitration scheme and also based on implementation of a credit based flow control mechanism to determine whether a virtual output module queue maintained at a central module from among one or more central modules coupled to the input module is available to receive the cell; and forward the cell from the selected virtual central module queue to the virtual output module queue, the virtual output module queue is to be associated with the input module and is also to be associated with the destination output port for the cell, wherein implementation of the credit-based flow control mechanism includes the input module manager logic also configured to:

subtract a credit unit based on forwarding the cell to the virtual output module queue; and add the credit unit based on forwarding the cell to a virtual output port queue maintained at the output module coupled to the destination output port, wherein the credit unit is subtracted or added to a cell credit indicating a capacity of the virtual output module queue to store data partitioned into one or more cells.

9. An apparatus according to claim 8, wherein the arbitration scheme comprises a round-robin arbitration scheme.

10. A three-stage memory-memory-memory (MMM) input-queued (IQC) packet switch comprising:

an input port configured to maintain a virtual output queue so that the virtual output queue is to store data partitioned into one or more cells destined for an output port, the input port having an input port manager, wherein the input port manager and the virtual output queue are arranged in cooperation with one another to store the one or more cells destined for the output port in the virtual output queue and to forward a cell of the one or more cells from the virtual output queue, wherein to forward the cell from the virtual output queue comprises the input port manager configured to forward the cell based, at least in part, on whether a virtual central module queue maintained at the input module is available to receive the cell forwarded from the virtual output queue, and whether a virtual central module is available to receive the cell forwarded from the virtual output queue further comprises the input port manager configured to implement a credit-based flow control mechanism the input port manager configured to implement the credit-based flow control mechanism includes the input port manager configured to:

subtract a credit unit based on the cell being forwarded to the virtual central module queue; and add the credit unit based on the cell being forwarded to the virtual output module queue, wherein the credit unit is to be subtracted or added to a cell credit indicating a capacity of the virtual central module queue to store data partitioned into one or more cells;

an input module coupled to the input port, the input module configured to maintain the virtual central module queue so that the virtual central module queue is to store the cell forwarded from the virtual output queue, the input module having an input module manager, wherein the input module manager and the virtual central module queue are arranged in cooperation with one another to receive the cell forwarded from the virtual output queue, store the cell in the virtual central module queue and forward the cell from the virtual central module queue;

a central module coupled to the input module, the central module configured to maintain a virtual output module queue so that the virtual output module queue is to store the cell forwarded from the virtual central module queue, the central module having a central module manager, wherein the central module manager and the virtual output module queue are arranged in cooperation with one another to receive the cell forwarded from the virtual central module queue, store the cell in the virtual output module queue and forward the cell from the virtual output module queue; and an output module coupled to the central module, the output module configured to maintain a virtual output port queue so that the virtual output port queue is to store the cell forwarded from the virtual output module queue, the output module having an output module manager, wherein the output module manager and the virtual output port queue are arranged in cooperation with one another to receive the cell forwarded from the virtual output module queue, store the cell in the virtual output port queue and forward the cell from the virtual output port queue.

11. A three-stage MMM IQC packet switch according to claim 10, wherein the input module manager is configured to forward the cell based on whether the virtual output module queue maintained at the central module is available to receive the cell forwarded from the virtual central module queue and based on an arbitration scheme.

12. A three-stage MMM IQC packet switch according to claim 11, wherein the arbitration scheme comprises a round-robin arbitration scheme.

13. A three-stage MMM IQC packet switch according to claim 10, wherein the central module manager is configured to forward the cell based on whether the virtual output port queue maintained at the output module is available to receive the cell forwarded from the virtual output module queue and based on an arbitration scheme.

14. A three-stage MMM IQC packet switch according to claim 13, wherein the arbitration scheme comprises a round-robin arbitration scheme.

15. A three-stage MMM IQC packet switch according to claim 10, wherein the output module manager is configured to forward the cell based on an arbitration scheme.

16. A three-stage MMM IQC packet switch according to claim 15, wherein the arbitration scheme comprises a round-robin arbitration scheme.

17. A computer program product comprising a non-transitory computer readable medium having instructions for forwarding data through a portion of a three-stage memory-memory-memory (MMM) input-queued Clos-network (IQC) packet switch, the data received at an input port for the three-stage MMM IQC packet switch, the data partitioned into one or more cells destined for an output port coupled to an output module for the three-stage MMM IQC packet switch, a cell from among the one or more cells forwarded to an input module coupled to the input port, the instructions, which, when executed by logic, cause the logic to:

select a virtual central module queue maintained at the input module for the three-stage MMM IQC packet switch to identify a selected virtual central module queue, the selected virtual central module queue maintained at the input module to store the cell forwarded from the input port and destined for the output port, wherein the selection is based on an arbitration scheme and also based on implementation of a credit based flow control mechanism to determine whether a virtual output module queue maintained at a central module from among one or more central modules coupled to the input module is available to receive the cell; and forward the cell from the selected virtual central module queue to the virtual output module queue, the virtual output module queue is to be associated with the input module and is also to be associated with the destination output port for the cell, wherein implementation of the credit-based flow control mechanism includes the logic to:
subtract a credit unit based on forwarding the cell to the virtual output module queue; and
add the credit unit based on forwarding the cell to a virtual output port queue maintained at the output module coupled to the destination output port, wherein the credit unit is subtracted or added to a cell credit indicating a capacity of the virtual output module queue to store data partitioned into one or more cells.

18. A computer program product according to claim 17, wherein the arbitration scheme comprises a round-robin arbitration scheme.

\* \* \* \* \*

UNITED STATES PATENT AND TRADEMARK OFFICE
CERTIFICATE OF CORRECTION

PATENT NO.       : 8,274,988 B2
APPLICATION NO.  : 12/511814
DATED            : September 25, 2012
INVENTOR(S)      : Rojas-Cessa et al.

Page 1 of 1

It is certified that error appears in the above-identified patent and that said Letters Patent is hereby corrected as shown below:

In the Drawings

In Fig. 15, Sheet 14 of 15, for Tag "1504", in Line 1, delete "for for" and insert -- for --, therefor.

In Fig. 16, Sheet 15 of 15, below "Processor (1610)", in Line 1, delete "uP/uC" and insert -- µP/µC --, therefor.

In Fig. 16, Sheet 15 of 15, in Box "(1615)", in Line 1, delete "Controler" and insert -- Controller --, therefor.

In the Specification

In Column 18, Line 27, delete "remaining) Processing" and insert -- remaining). Processing --, therefor.

In the Claims

In Column 25, Line 24, in Claim 10, delete "input-queued" and insert -- input-queued Clos-network --, therefor.

Signed and Sealed this
Eleventh Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,274,988 B2  
APPLICATION NO. : 12/511814  
DATED : September 25, 2012  
INVENTOR(S) : Rojas-Cessa et al.

It is certified that error appears in the above-identified patent and that said Letters Patent is hereby corrected as shown below:

In the Specification

Column 1, Lines 8-9, delete "This work was supported in part by National Science Foundation grant number CNS-0435250." and insert the following thereto: -- This invention was made with government support under grant number CNS-0435250 awarded by the National Science Foundation. The government has certain rights in the invention. --

Signed and Sealed this
Thirteenth Day of August, 2019

Andrei Iancu
*Director of the United States Patent and Trademark Office*